US010967257B2

United States Patent
Suzuki

(10) Patent No.: US 10,967,257 B2
(45) Date of Patent: *Apr. 6, 2021

(54) GAME CONTROL METHOD, SERVER DEVICE, GAME SYSTEM, AND COMPUTER-READABLE RECORDING MEDIUM

(71) Applicant: GREE, INC., Tokyo (JP)

(72) Inventor: Koichi Suzuki, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,502

(22) Filed: Jun. 27, 2019

(65) Prior Publication Data

US 2019/0314723 A1  Oct. 17, 2019

Related U.S. Application Data

(63) Continuation of application No. 16/035,368, filed on Jul. 13, 2018, now Pat. No. 10,369,464, which is a (Continued)

(30) Foreign Application Priority Data

Jun. 21, 2013 (JP) ................... 2013-130237
Dec. 13, 2013 (JP) ................... 2013-257677
Mar. 10, 2014 (JP) ................... 2014-046141

(51) Int. Cl.
*A63F 13/35* (2014.01)
*A63F 13/795* (2014.01)
*A63F 13/822* (2014.01)

(52) U.S. Cl.
CPC ............ *A63F 13/35* (2014.09); *A63F 13/795* (2014.09); *A63F 13/822* (2014.09); *A63F 2300/5566* (2013.01)

(58) Field of Classification Search
USPC ........................................... 463/42
See application file for complete search history.

(56) References Cited

U.S. PATENT DOCUMENTS 6,736,724 B1 * 5/2004 Erikawa ................. A63F 13/10
463/7
7,955,175 B1    6/2011 Holloway et al.
(Continued)

FOREIGN PATENT DOCUMENTS

| JP | 2010-237970 A | 10/2010 |
| JP | 2012-000361 A | 1/2012 |
| JP | 2012-053640 A | 3/2012 |

OTHER PUBLICATIONS

"Red Stone", <http://ja.wikipedia.org/w/index.php?title=RED_STONE &oldid=47013505#.E3.82.AE.E3.83.AB.E3.83.89>, Mar. 29, 2013, 22 pages, with English language.
(Continued)

*Primary Examiner* — Pierre E Elisca
(74) *Attorney, Agent, or Firm* — Faegre Drinker Biddle & Reath LLP

(57) ABSTRACT

A social game and the like that can increase the fun and amusement of a team battle and enhance players' motivation to participate in or continue a game by suppressing an occurrence of any non-participation team not participating in the battle are provided. A guild status determination unit determines, for each guild, whether the guild is in an inactive state or an active state, based on a result of detecting a login state of each player. A guild integrated control unit forcibly disbands a guild (i.e. an inactive guild) determined to be in the inactive state, based on guild activity information notified from the status determination unit. A disbandment notification unit notifies each player belonging to the inactive guild, of the disbandment of the guild.

11 Claims, 12 Drawing Sheets

Related U.S. Application Data continuation of application No. 15/363,435, filed on Nov. 29, 2016, now Pat. No. 10,039,977, which is a continuation of application No. 14/309,814, filed on Jun. 19, 2014, now Pat. No. 9,539,517.

(56) References Cited

U.S. PATENT DOCUMENTS

| | | | |
|---|---|---|---|
| 8,287,382 B2 | 10/2012 | Holloway et al. | |
| 2009/0093300 A1* | 4/2009 | Lutnick | G07F 17/3244 463/26 |
| 2011/0151976 A1 | 6/2011 | Holloway et al. | |
| 2011/0201426 A1* | 8/2011 | Fujimoto | A63F 13/822 463/31 |
| 2011/0237335 A1* | 9/2011 | Holloway | A63F 13/822 463/42 |
| 2013/0143669 A1* | 6/2013 | Muller | A63F 13/69 463/42 |
| 2014/0025732 A1 | 1/2014 | Lin et al. | |
| 2014/0323228 A1* | 10/2014 | Kusano | A63F 13/847 463/42 |
| 2014/0357360 A1 | 12/2014 | Shone et al. | |
| 2015/0105161 A1* | 4/2015 | Sumaki | A63F 13/67 463/42 |
| 2016/0184706 A1* | 6/2016 | Muller | A63F 13/35 463/42 |

OTHER PUBLICATIONS

"Lucent Heart Strategic Information Regarding Disbandment of Clans", <http:// lucentheartwiki.hardrain.net/index.php?System%2F%E3%82%AF%E3%83%A9%E3%83%B3>, Sep. 27, 2012, 7 pages, with English language.

"Battlefield 2 Clan Tournament League "BF2CTL" New Season Opening", 4Gamer.net <http://www.4gamer.net/news/history/2006.06/20060630202430detail.html>, Jun. 30, 2006, 3 pages, with English language.

Final Office Action issued in related application JP 2014-137421 with English language translation, dated Mar. 17, 2015, 5 pages.

Office Action issued in related application JP 2014-137421 with English language translation, Sep. 18, 2014, 6 pages.

Report of Reconsideration by Examiner before Appeal issued in related application JP 2014-137421 with English language translation, Jun. 30, 2015, 7 pages.

Petition for Inter Partes Review IPR2021-00499 of U.S. Pat. No. 10,039,977, filed Feb. 5, 2021, 90 pages.

IPR2021-00499, Exhibit 1009—U.S. Pat. No. 2014/0025732 ("Lin"), 19 pages.

IPR2021-00499, Exhibit 1010—Job openings posted at RiotGames.com (archived at web.archive.org, Apr.—May 2012), 24 pages.

IPR2021-00499, Exhibit 1011—Record of Assignment of U.S. Appl. No. 13/551,338 from Jeffrey Lin and Paul Sottasanti to Riot Games, Inc. (Sep. 5, 2012), 4 pages.

IPR2021-00499, Exhibit 1012—Game information from na.LeagueOfLegends.com (archived at web.archive.org, 2012-2013) ("LoL Game Info"), 28 pages.

IPR2021-00499, Exhibit 1013—Homepage from na.LeagueOfLegends.com (archived at web.archive.org, May 13, 2012), 10 pages.

IPR2021-00499, Exhibit 1014—Screenshots from League of Legends gameplay video (Jun. 2, 2010), 2 pages.

IPR2021-00499, Exhibit 1015—Screenshots from League of Legends gameplay video (Jun. 28, 2011), 4 pages.

IPR2021-00499, Exhibit 1016—Screenshots from League of Legends gameplay video (Jun. 28, 2011 and Oct. 7, 2011), 4 pages.

IPR2021-00499, Exhibit 1017—League of Legends—Early Aug. Patch Preview (Jul. 27 2012), from www.YouTube.com (archived at web.archive.org, Jul. 28—Aug. 2, 2012), with screenshot from League of Legends gameplay video (Jul. 27, 2012), 7 pages.

IPR2021-00499, Exhibit 1018—League of Legends (PC) FAQ by randomsomel (Oct. 25, 2010), from www.GameFAQs.com (archived at web.archive.org, Mar. 3, 2012) ("LoL 2010 Faq"), 19 pages.

IPR2021-00499, Exhibit 1019—League of Legends FAQs, Walkthroughs, and Guides for PC, from www.GameFAQs.com (archived at web.archive.org, Jul. 7, 2011), 2 pages.

IPR2021-00499, Exhibit 1020—League of Legends, from en.Wikipedia.org (archived at web.archive.org, Mar. 7, 2013), 6 pages.

IPR2021-00499, Exhibit 1021—Ryan Scott, the Consensus: League of Legends Review (Nov. 30, 2019), from pc.GameSpy.com (archived at web.archive.org, Jan. 29, 2013 and May 1, 2012), 5 pages.

IPR2021-00499, Exhibit 1022—Todd Kenreck, "League of Legends" Players Log 1 Billion Hours a Month, www.NBCNews.com (archived at web.archive.org, Mar. 5, 2013), 2 pages.

IPR2021-00499, Exhibit 1023—Matt Liebl, League of Legends Wins 2011 Golden Joystick Award for Best Free-to Play Game, www.GameZone.com (archived at web.archive.org, Mar. 13, 2013), 7 pages.

IPR2021-00499, Exhibit 1024—Quintin Smith, League of Legends Review (Nov. 27, 2009), from www.EuroGamer.net (archived at web.archive.org, Mar. 25, 2013), 10 pages.

IPR2021-00499, Exhibit 1025—Matchmaking Changes [Jan. 16, 2013]—League of Legends Community (Aug. 2, 2012), from na.LeagueOfLegends.com (archived at web.archive.org, Jan. 21, 2013), 3 pp.

IPR2021-00499, Exhibit 1026—New AFK Detection for Matchmade Games—League of Legends Community (index and all pages) (Aug. 2—Oct. 25, 2012), from na.LeagueOfLegends.com (archived at web.archive.org, 2012-2020), 42 pages.

IPR2021-00499, Exhibit 1027—8-2 News: Nothing Too Exciting (Aug. 2, 2012), from www.SurrenderAt20.net (archived at web.archive.org, Aug. 12, 2012), 6 pages.

IPR2021-00499, Exhibit 1028—[Call to Action] Help Us Test Matchmakings New AFK Detection League of Legends Community (Jul. 11-13, 2012), from na.LeagueOfLegends.com (archived at web.archive.org, Jul. 12-16, 2012), 20 pages.

IPR2021-00499, Exhibit 1029—PBE: AFK Players Are Now Kicked Instead of Random'd—League of Legends (Mar. 6, 2013), from GameFAQs.GameSpot.com, with Game Alert screenshot (archived at web.archive.org, Mar. 9, 2013), 6 pages.

IPR2021-00499, Exhibit 1030—New Matchmaking System Yo—League of Legends (Jul. 11, 2012), https://gamefaqs.gamespot.com/boards/954437-league-of- legends/63380249, 4 pages.

IPR2021-00499, Exhibit 1031—Release Notes (index), from na.LeagueOfLegends.com (archived at web.archive.org, Mar. 29, 2013), 2 pages.

IPR2021-00499, Exhibit 1032—Patch 3.5 Notes (Mar. 27, 2013), from na.LeagueaOfLegends.com (archived at web.archive.org, Mar. 31, 2013) ("LoL Patch 3.5 Notes"), 4 pages.

IPR2021-00499, Exhibit 1033—Surrender at 20: Patch 3.5 Notes (Mar. 27, 2013), from www.SurrenderAt20.net (archived at web.archive.org, Mar. 30, 2013), 3 pages.

IPR2021-00499, Exhibit 1034—League of Legends Patch 3.5 Patch Notes (Mar. 28, 2013), from UndergroundDuelists.wordpress.com, 1 page.

IPR2021-00499, Exhibit 1035—League of Legends Friends Blog Posts (Mar. 2013), from www.Anook.com (archived at web.archive.org, Jun. 1, 2013, with live version of website included for legibility), 21 pages.

IPR2021-00499, Exhibit 1036—Patch 3.5 Notes—League of Legends (Mar. 27, 2013), from GameFAQs.GameSpot.com, 6 pages.

IPR2021-00499, Exhibit 1037—Thank You Riot Yay—League of Legends (Mar. 28, 2013), from GameFAQs.GameSpot.com, 3 pages.

IPR2021-00499, Exhibit 1038—Christopher MacManus, *League of Legends*: the World's "Most Played Video Game" (Oct. 12, 2012), from News.CNET.com (archived at web.archive.org, Mar. 8, 2013), 2 pages.

IPR2021-00499, Exhibit 1039—League of Legends infographic (archived at web.archive.org, Mar. 29, 2013), 3 pages.

IPR2021-00499, Exhibit 1040—Am I the Only One Whos[e] "Play Again" Button Isn't Working? League of Legends (Nov. 24, 2011), https://gamefaqs.gamespot.com/ boards/954437-league-of-legends/61138679, 3 pages.

(56) References Cited

OTHER PUBLICATIONS

IPR2021-00499, Exhibit 1041—League of Legends Community (index), from na.LeagueOfLegends.com (archived at web.archive.org, Jul. 19, 2012), 5 pages.
IPR2021-00499, Exhibit 1042—Sign-ups for the Public Beta Environment—League of Legends Community (Aug. 9, 2012), from na.LeagueOfLegends.com (archived at web.archive.org, Sep. 4, 2012), 3 pages.
IPR2021-00499, Exhibit 1043—Saying Farewell to Boards (Mar. 9, 2020), https://na.leagueoflegends.com/en-us/news/community/saying-farewell-to-boards/, 4 pages.
IPR2021-00499, Exhibit 1047—PC Gamer, Face Off. Is League of Legends a Better Game than Dota 2? (Feb. 27, 2013), https://www.pcgamer.com/face-off-league-of- legends-vs-dota-2/, 12 pages.
IPR2021-00499, Exhibit 1050—Comprehensive Dota 2 Guide, from SteamCommunity.com (archived at web.archive.org, Feb. 6, 2013) ("Dota 2 Guide"), 41 pages.
IPR2021-00499, Exhibit 1051—Win/Loss/Abandon Feedback, from Dev.Dota2.com (archived at web.archive.org, Nov. 3, 2012) ("Win/Loss/Abandon Feedback"), 7 pages.
IPR2021-00499, Exhibit 1052—Dota 2, from en.Wikipedia.org (archived at web.archive.org, Mar. 24, 2013), 6 pages.
IPR2021-00499, Exhibit 1053—Screenshots from Dota 2 gameplay video (Jan. 8, 2013), 2 pages.
IPR2021-00499, Exhibit 1054—Screenshots from Dota 2 gameplay video (Jun. 6, 2012), with Dota 2 Gameplay—HD, from www.YouTube.com (archived at web.archive.org, Aug. 26, 2012), 9 pages.
IPR2021-00499, Exhibit 1055—Dota 2 Server Information and Discussion (Nov. 26-27, 2012), from Dev.Dota2.com, 6 pages.
IPR2021-00499, Exhibit 1056—South East Asia and China Server Information (Nov. 29—Dec. 1, 2011), from Dev.Dota2.com, 5 pages.
IPR2021-00499, Exhibit 1057—Transitioning Into Launch Mode (Jun. 21, 2013), from Blog.Dota2.com (archived at web.archive.org, Jun. 24, 2013), 3 pages.
IPR2021-00499, Exhibit 1058—Matchmaking, from www.Dota2Wiki.com (archived at web.archive.org, May 17, 2013), 3 pages.
IPR2021-00499, Exhibit 1059—Dota 2—Knowledge Base—Steam Support, from Support.SteamPowered.com (archived at web.archive.org, Apr. 23, 2013), 2 pages.
IPR2021-00499, Exhibit 1060—News—Dota 2 Update Released (Nov. 3, 2011), from Store.SteamPowered.com (archived at web.archive.org, Nov. 5, 2011), 2 pages.
IPR2021-00499, Exhibit 1061—News—Dota 2 Update Released (Dec. 1, 2011), from Store.SteamPowered.com (archived at web.archive.org, Dec. 26, 2011), 3 pages.
IPR2021-00499, Exhibit 1062—the Crusade Continues (Nov. 3, 2011), from Blog.Dota2.com (archived at web.archive.org, Feb. 26, 2012), 2 pages.
IPR2021-00499, Exhibit 1063—Commend/Report/Ban Feedback (Feb. 23 - Aug. 1 2012), from Dev.Dota2.com (archived at web.archive.org, Nov. 3, 2012), 4 pages.
IPR2021-00499, Exhibit 1064—Common Discussions—Do Not Open New Threads About These Issues (Dec. 3, 2011), from Dev.Dota2.com (archived at web.archive.org, Nov. 3, 2012), 2 pages.
IPR2021-00499, Exhibit 1065—Dota2 Dev, from Dev.Dota2.com (archived at web.archive.org, Nov. 27, 2012), 2 pages.
IPR2021-00499, Exhibit 1066—Misc (index), from Dev.Dota2.com (archived at web.archive.org, Nov. 5, 2012), 3 pages.
IPR2021-00499, Exhibit 1067—Protip: Wait 5+ Minutes Before You Queue Again—Dota 2 (May 18, 2014), from GameFAQs.GameSpot.com, 4 pages.
IPR2021-00499, Exhibit 1068—Surrendering in Dota (Nov. 8, 2012), https://www.liquiddota.com/ forum/dota-2-general/453646-surrendering-in-dota, 4 pages.
IPR2021-00499, Exhibit 1069—Kris Graft, Stardock Reveals Impulse, Steam Market Share Estimates (Nov. 19, 2009), from www.Gamasutra.com (archived at https://web.archive.org, Apr. 11, 2011), 3 pages.
IPR2021-00499, Exhibit 1070—Steam Surpasses 30 Million Account Mark (Oct. 18, 2010), from Store.SteamPowered.com (archived at https://web.archive.org, Apr. 27, 2011), 2 pages.
IPR2021-00499, Exhibit 1071—Welcome to Valve, from www.ValveSoftware.com (archived at https://web.archive.org, Aug. 25, 2012), 2 pages.
IPR2021-00499, Exhibit 1072—Keza MacDonald, *IGN People's Choice Award: and the Winner Is* . . . (Aug. 23, 2011), from www.Ign.com (archived at https://web.archive.org, Mar. 25, 2013), 4 pages.
IPR2021-00499, Exhibit 1073—the PC Gamer 2012 Game of the Year Nominees (Dec. 11, 2012), from www.PCGamer.com (archived at https://web.archive.org/, Apr. 3, 2013), 6 pages.
IPR2021-00499, Exhibit 1074—Steam Community: Dota 2, home search page, from SteamCommunity.com (archived at web.archive.org, Apr. 20, 2013), 2 pages.
IPR2021-00499, Exhibit 1075—Steam Community: Guides, from SteamCommunity.com (archived at web.archive.org, Feb. 16, 2013), 2 pages.
IPR2021-00499, Exhibit 1076—Valve Press Release, Steam Guides Available Now (Jan. 17, 2013), from Store.SteamPowered.com (archived at web.archive.org, Mar. 17, 2013), 2 pages.
IPR2021-00499, Exhibit 1077—Steam Community: Dota 2 Guides, Top Rated, from SteamCommunity.com (archived at web.archive.org, May 17, 2013), 4 pages.
IPR2021-00499, Exhibit 1079—Comprehensive Dota 2 Guide, from SteamCommunity.com (archived at web.archive.org, Nov. 24, 2013), 56 pages.
IPR2021-00499, Exhibit 1080—Comprehensive Dota 2 Guide, from SteamCommunity.com (archived at web.archive.org, Jul. 15, 2013), 44 pages.
IPR2021-00499, Exhibit 1081—Dota Team, *Unleashed at Last*! (Dec. 2, 2011), from Blog.Dota2.com (archived at web.archive.org, Jan. 7, 2012), 2 pages.
IPR2021-00499, Exhibit 1082—Wayback Machine General Information, https://help.archive.org/hc/en- us/articles/360004716091-Wayback-Machine-General-Information (last visited Jan. 3, 2021), 4 pages.
IPR2021-00499, Exhibit 1083—Using the Wayback Machine, https://help.archive.org/hc/en-us/ articles/360004651732-Using-The-Wayback-Machine (last visited Jan. 3, 2021), 5 pages.
IPR2021-00499, Exhibit 1084—Dota 2 on Steam, from Store.SteamPowered.com (archived at web.archive.org, Feb. 7, 2013), 3 pages.
IPR2021-00499, Exhibit 1085—Steam Community Hub—Dota 2, from SteamCommunity.com (archived at web.archive.org, May 1, 2013), 1 page.
IPR2021-00499, Exhibit 1086—Valve Software Jobs, from www.ValveSoftware.com (archived at web.archive.org, Feb. 15, 2013), 2 pages.
IPR2021-00499, Exhibit 1087—Valve Software Jobs Postings, from www.ValveSoftware.com (archived at web.archive.org, Feb. 18, 2013), 2 pages.
IPR2021-00499, Exhibit 1088—How the Cooldown Abandon Works (Jul. 25, 2012), https://dev.dota2.com/forum/dota-2/misc/49918-how-the-cooldown- abandon-works, 5 pages.
IPR2021-00499, Exhibit 1089—Dota 2 Update (Jul. 26, 2012), from Store.SteamPowered.com (archived at web.archive.org, Jul. 27, 2012), 2 pages.
IPR2021-00499, Exhibit 1090—Added a Cooldown to Being Able to Find a Match When a Player Declines . . . (Jul. 25, 2012), https://gamefaqs.gamespot.com/boards/610657-dota-2/63521578, 3 pages.
IPR2021-00499, Exhibit 1091—Surrender at 20: RiotKiddington Explains Queue Dodging (Feb. 11, 2013), from www.SurrenderAt20.net (archived at web.archive.org, Feb. 13, 2013), 3 pages.
IPR2021-00499, Exhibit 1092—Dodge Penalty = Reward Idiots, Penalize People Who Care League of Legends Community, from na.LeagueOfLegends.com (archived at web.archive.org, Feb. 15, 2013), 7 pges.

(56) References Cited

OTHER PUBLICATIONS

IPR2021-00499, Exhibit 1093—League of Legends—What are the Penalties for Leaving the Game or Surrendering?—Arqade, from Gaming.StackExchange.com (archived at web.archive.org, May 12, 2013), 2 pages.
Petition for Inter Partes Review IPR2021-00500 of U.S. Pat. No. 9,539,517, filed Feb. 5, 2021, 91 pages.
IPR2021-00500, Exhibit 1009—U.S. Pat. No. 2014/0025732 ("Lin"), 19 pages.
IPR2021-00500, Exhibit 1010—Job openings posted at RiotGames. com (archived at web.archive.org, Apr.—May 2012), 24 pages.
IPR2021-00500, Exhibit 1011—Record of Assignment of U.S. Appl. No. 13/551,338 from Jeffrey Lin and Paul Sottasanti to Riot Games, Inc. (Sep. 5, 2012), 4 pages.
IPR2021-00500, Exhibit 1012—Game information from na.LeagueOfLegends.com (archived at web.archive.org, 2012-2013) ("LoL Game Info"), 28 pages.
IPR2021-00500, Exhibit 1013—Homepage from na.LeagueOfLegends. com (archived at web.archive.org, May 13, 2012), 10 pages.
IPR2021-00500, Exhibit 1014—Screenshots from League of Legends gameplay video (Jun. 2, 2010), 2 pages.
IPR2021-00500, Exhibit 1015—Screenshots from League of Legends gameplay video (Jun. 28, 2011), 4 pages.
IPR2021-00500, Exhibit 1016—Screenshots from League of Legends gameplay video (Jun. 28, 2011 and Oct. 7, 2011), 4 pages.
IPR2021-00500, Exhibit 1017—League of Legends—Early Aug. Patch Preview (Jul. 27, 2012), from www.YouTube.com (archived at web.archive.org, Jul. 28—Aug. 2, 2012), with screenshot from League of Legends gameplay video (Jul. 27, 2012), 7 pages.
IPR2021-00500, Exhibit 1018—League of Legends (PC) FAQ by randomsomel (Oct. 25, 2010), from www.GameFAQs.com (archived at web.archive.org, Mar. 3, 2012) ("LoL 2010 FAQ"), 19 pages.
IPR2021-00500, Exhibit 1019—League of Legends FAQs, Walkthroughs, and Guides for PC from www.GameFAQs.com (archived at web.archive.org, Jul. 7, 2011), 2 pages.
IPR2021-00500, Exhibit 1020—League of Legends, from en.Wikipedia. org (archived at web.archive.org, Mar. 7, 2013), 6 pages.
IPR2021-00500, Exhibit 1021—Ryan Scott, the Consensus: League of Legends Review (Nov. 30, 2019), from pc.GameSpy.com (archived at web.archive.org, Jan. 29, 2013 and May 1, 2012), 5 pages.
IPR2021-00500, Exhibit 1022—Todd Kenreck, "League of Legends" Players Log 1 Billion Hours a Month, www.NBCNews.com (archived at web.archive.org, Mar. 5, 2013), 2 pages.
IPR2021-00500, Exhibit 1023—Matt Liebl, League of Legends Wins 2011 Golden Joystick Award for Best Free-to Play Game, www.GameZone.com (archived at web.archive.org, Mar. 13, 2013), 7 pages.
IPR2021-00500, Exhibit 1024—Quintin Smith, League of Legends Review (Nov. 27, 2009), from www.EuroGamer.net (archived at web.archive.org, Mar. 25, 2013), 10 pages.
IPR2021-00500, Exhibit 1025—Matchmaking Changes [Jan. 16, 2013]—League of Legends Community (Aug. 2, 2012), from na.LeagueOfLegends.com (archived at web.archive.org, Jan. 21, 2013), 3 pages.
IPR2021-00500, Exhibit 1026—New AFK Detection for Matchmade Games—League of Legends Community (index and all pages) (Aug. 2—Oct. 25, 2012), from na.LeagueOfLegends.com (archived at web.archive.org, 2012-2020), 42 pages.
IPR2021-00500, Exhibit 1027—8-2 News: Nothing Too Exciting (Aug. 2, 2012), from www.SurrenderAt20.net (archived at web. archive.org, Aug. 12, 2012), 6 pages.
IPR2021-00500, Exhibit 1028-[Call to Action] Help Us Test Matchmakings New AFK Detection League of Legends Community (Jul. 11-13, 2012), from na.LeagueOfLegends.com (archived at web. archive.org, Jul. 12-16, 2012), 20 pages.
IPR2021-00500, Exhibit 1029—PBE: AFK Players Are Now Kicked Instead of Random'd—League of Legends (Mar. 6, 2013), from GameFAQs.GameSpot.com, with Game Alert screenshot (archived at web.archive.org, Mar. 9, 2013), 6 pages.

IPR2021-00500, Exhibit 1030—New Matchmaking System Yo—League of Legends (Jul. 11, 2012), https://gamefaqs.gamespot.com/boards/954437-league-of-legends/63380249, 4 pages.
IPR2021-00500, Exhibit 1031—Release Notes (index), from na.LeagueOfLegends.com (archived at web.archive.org, Mar. 29, 2013), 2 pages.
IPR2021-00500, Exhibit 1032—Patch 3.5 Notes (Mar. 27, 2013), from na.LeagueaOfLegends.com (archived at web.archive.org, Mar. 31, 2013) ("LoL Patch 3.5 Notes"), 4 pages.
IPR2021-00500, Exhibit 1033—Surrender at 20: Patch 3.5 Notes (Mar. 27, 2013), from www.SurrenderAt20.net (archived at web. archive.org, Mar. 30, 2013), 3 pages.
IPR2021-00500, Exhibit 1034—League of Legends Patch 3.5 Patch Notes (Mar. 28, 2013), from UndergroundDuelists.wordpress.com, 1 pages.
IPR2021-00500, Exhibit 1035—League of Legends Friends Blog Posts (Mar. 2013), from www.Anook.com (archived at web.archive. org, Jun. 1, 2013, with live version of website included for legibility), 21 pages.
IPR2021-00500, Exhibit 1036—Patch 3.5 Notes—League of Legends (Mar. 27, 2013), from GameFAQs.GameSpot.com, 6 pages.
IPR2021-00500, Exhibit 1037—Thank You Riot Yay—League of Legends (Mar. 28, 2013), from GameFAQs.GameSpot.com, 3 pages.
IPR2021-00500, Exhibit 1038—Christopher MacManus, League of Legends: The World's "Most Played Video Game" (Oct. 12, 2012), from News.Cnet.com (archived at web.archive.org, Mar. 8, 2013), 2 pages.
IPR2021-00500, Exhibit 1039—League of Legends infographic (archived at web.archive.org, Mar. 29, 2013), 3 pages.
IPR2021-00500, Exhibit 1040—Am I the Only One Whos[e] "Play Again" Button Isn't Working? League of Legends (Nov. 24, 2011), https://gamefaqs.gamespot.com/ boards/954437-league-of-legends/61138679, 3 pages.
IPR2021-00500, Exhibit 1041—League of Legends Community (index), from na.LeagueOfLegends.com (archived at web.archive. org, Jul. 19, 2012), 5 pages.
IPR2021-00500, Exhibit 1042—Sign-ups for the Public Beta Environment—League of Legends Community (Aug. 9, 2012), from na.LeagueOfLegends.com (archived at web.archive.org, Sep. 4, 2012), 3 pages.
IPR2021-00500, Exhibit 1043—Saying Farewell to Boards (Mar. 9, 2020), https://na.leagueoflegends.com/en-us/news/community/saying-farewell-to-boards/, 4 pages.
IPR2021-00500, Exhibit 1047—PC Gamer, Face Off. Is League of Legends a Better Game than Dota 2? (Feb. 27, 2013), https://www. pcgamer.com/face-off-league-of- legends-vs-dota-2/, 12 pages.
IPR2021-00500, Exhibit 1050—Comprehensive Dota 2 Guide, from SteamCommunity.com (archived at web.archive.org, Feb. 6, 2013) ("Dota 2 Guide"), 41 pages.
IPR2021-00500, Exhibit 1051—Win/Loss/Abandon Feedback, from Dev.Dota2.com (archived at web.archive.org, Nov. 3, 2012) ("Win/Loss/Abandon Feedback"), 7 pages.
IPR2021-00500, Exhibit 1052—Dota 2, from en.VVikipedia.org (archived at web.archive.org, Mar. 24, 2013), 6 pages.
IPR2021-00500, Exhibit 1053—Screenshots from Dota 2 gameplay video (Jan. 8, 2013), 2 pages.
IPR2021-00500, Exhibit 1054—Screenshots from Dota 2 gameplay video (Jun. 6, 2012), with Dota 2 Gameplay—HD, from www. YouTube.com (archived at web.archive.org, Aug. 26, 2012), 9 pages.
IPR2021-00500, Exhibit 1055—Dota 2 Server Information and Discussion (Nov. 26-27, 2012), from Dev.Dota2.com, 6 pages.
IPR2021-00500, Exhibit 1056—South East Asia and China Server Information (Nov. 29—Dec. 1, 2011), from Dev.Dota2.com, 5 pages.
IPR2021-00500, Exhibit 1057—Transitioning Into Launch Mode (Jun. 21, 2013), from Blog.Dota2.com (archived at web.archive.org, Jun. 24, 2013), 3 pages.
IPR2021-00500, Exhibit 1058—Matchmaking, from www.Dota2Wiki. com (archived at web.archive.org, May 17, 2013), 3 pages.
IPR2021-00500, Exhibit 1059—Dota 2—Knowledge Base—Steam Support, from Support.SteamPowered.com (archived at web.archive. org, Apr. 23, 2013), 2 pages.

(56) References Cited

OTHER PUBLICATIONS

IPR2021-00500, Exhibit 1060—News—Dota 2 Update Released (Nov. 3, 2011), from Store.SteamPowered.com (archived at web.archive.org, Nov. 5, 2011), 2 pages.
IPR2021-00500, Exhibit 1061—News—Dota 2 Update Released (Dec. 1, 2011), from Store.SteamPowered.com (archived at web.archive.org, Dec. 26, 2011), 3 pages.
IPR2021-00500, Exhibit 1062—The Crusade Continues (Nov. 3, 2011), from Blog.Dota2.com (archived at web.archive.org, Feb. 26, 2012), 2 pages.
IPR2021-00500, Exhibit 1063—Commend/Report/Ban Feedback (Feb. 23—Aug. 1 2012), from Dev.Dota2.com (archived at web.archive.org, Nov. 3, 2012), 4 pages.
IPR2021-00500, Exhibit 1064—Common Discussions—Do Not Open New Threads About These Issues (Dec. 3, 2011), from Dev.Dota2.com (archived at web.archive.org, Nov. 3, 2012), 2 pages.
IPR2021-00500, Exhibit 1065—Dota2 Dev, from Dev.Dota2.com (archived at web.archive.org, Nov. 27, 2012), 2 pages.
IPR2021-00500, Exhibit 1066—Misc (index), from Dev.Dota2.com (archived at web.archive.org, Nov. 5, 2012), 3 pages.
IPR2021-00500, Exhibit 1067—Protip: Wait 5+ Minutes Before You Queue Again—Dota 2 (May 18, 2014), from GameFAQs.GameSpot.com, 4 pages.
IPR2021-00500, Exhibit 1068—Surrendering in Dota (Nov. 8, 2012), https://www.liquiddota.com/ forum/dota-2-general/453646-surrendering-in-dota, 4 pages.
IPR2021-00500, Exhibit 1069—Kris Graft, *Stardock Reveals Impulse, Steam Market Share Estimates* (Nov. 19, 2009), from www.Gamasutra.com (archived at https://web.archive.org, Apr. 11, 2011), 3 pages.
IPR2021-00500, Exhibit 1070—Steam Surpasses 30 Million Account Mark (Oct. 18, 2010), from Store.SteamPowered.com (archived at https://web.archive.org, Apr. 27, 2011), 2 pages.
IPR2021-00500, Exhibit 1071—Welcome to Valve, from www.ValveSoftware.com (archived at https://web.archive.org, Aug. 25, 2012), 2 pages.
IPR2021-00500, Exhibit 1072—Keza MacDonald, *IGN People's Choice Award: and the Winner Is* . . . (Aug. 23, 2011), from www.IGN.com (archived at https://web.archive.org, Mar. 25, 2013), 4 pp.
IPR2021-00500, Exhibit 1073—the PC Gamer 2012 Game of the Year Nominees (Dec. 11, 2012), from www.PCGamer.com (archived at https://web.archive.org/, Apr. 3, 2013), 6 pages.
IPR2021-00500, Exhibit 1074—Steam Community: Dota 2, home search pages, from SteamCommunity.com (archived at web.archive.org, Apr. 20, 2013), 2 pages.
IPR2021-00500, Exhibit 1075—Steam Community: Guides, from SteamCommunity.com (archived at web.archive.org, Feb. 16, 2013), 2 pages.
IPR2021-00500, Exhibit 1076—Valve Press Release, Steam Guides Available Now (Jan. 17, 2013), from Store.SteamPowered.com (archived at web.archive.org, Mar. 17, 2013), 2 pages.
IPR2021-00500, Exhibit 1077—Steam Community: Dota 2 Guides, Top Rated, from SteamCommunity.com (archived at web.archive.org, May 17, 2013), 4 pages.
IPR2021-00500, Exhibit 1079—Comprehensive Dota 2 Guide, from SteamCommunity.com (archived at web.archive.org, Nov. 24, 2013), 56 pages.
IPR2021-00500, Exhibit 1080—Comprehensive Dota 2 Guide, from SteamCommunity.com (archived at web.archive.org, Jul. 15, 2013), 44 pages.
IPR2021-00500, Exhibit 1081—Dota Team, Unleashed at Last! (Dec. 2, 2011), from Blog.Dota2.com (archived at web.archive.org, Jan. 7, 2012), 2 pages.
IPR2021-00500, Exhibit 1082—Wayback Machine General Information, https://help.archive.org/hc/en- us/articles/360004716091-Wayback-Machine-General-Information (last visited Jan. 3, 2021), 4 pages.
IPR2021-00500, Exhibit 1083—Using the Wayback Machine, https://help.archive.org/hc/en-us/ articles/360004651732-Using-The-Wayback-Machine (last visited Jan. 3, 2021), 5 pages.
IPR2021-00500, Exhibit 1084—Dota 2 on Steam, from Store.SteamPowered.com (archived at web.archive.org, Feb. 7, 2013), 3 pages.
IPR2021-00500, Exhibit 1085—Steam Community Hub—Dota 2, from SteamCommunity.com (archived at web.archive.org, May 1, 2013), 1 page.
IPR2021-00500, Exhibit 1086—Valve Software Jobs, from www.ValveSoftware.com (archived at web.archive.org, Feb. 15, 2013), 2 pages.
IPR2021-00500, Exhibit 1087—Valve Software Jobs Postings, from www.ValveSoftware.com (archived at web.archive.org, Feb. 18, 2013), 2 pages.
Petition for Inter Partes Review IPR2021-00501 of U.S. Patent No. 10,369,464, filed Feb. 5, 2021, 90 pages.
IPR2021-00501, Exhibit 1009—U.S. Pat. No. 2014/0025732 ("Lin"), 19 pages.
IPR2021-00501, Exhibit 1010—Job openings posted at RiotGames.com (archived at web.archive.org, Apr.—May 2012), 24 pages.
IPR2021-00501, Exhibit 1011—Record of Assignment of U.S. Appl. No. 13/551,338 from Jeffrey Lin and Paul Sottasanti to Riot Games, Inc. (Sep. 5, 2012), 4 pages.
IPR2021-00501, Exhibit 1012—Game information from na.LeagueOfLegends.com (archived at web.archive.org, 2012-2013) ("LoL Game Info"), 28 pages.
IPR2021-00501, Exhibit 1013—Homepage from na.LeagueOfLegends.com (archived at web.archive.org, May 13, 2012), 10 pages.
IPR2021-00501, Exhibit 1014—Screenshots from League of Legends gameplay video (Jun. 2, 2010), 2 pages.
IPR2021-00501, Exhibit 1015—Screenshots from League of Legends gameplay video (Jun. 28, 2011), 4 pages.
IPR2021-00501, Exhibit 1016—Screenshots from League of Legends gameplay video (Jun. 28, 2011 and Oct. 7, 2011), 4 pages.
IPR2021-00501, Exhibit 1017—League of Legends—Early Aug. Patch Preview (Jul. 27 2012), from www.YouTube.com (archived at web.archive.org, Jul. 28—Aug. 2, 2012), with screenshot from League of Legends gameplay video (Jul. 27, 2012), 7 pages.
IPR2021-00501, Exhibit 1018—League of Legends (PC) FAQ by randomsomel (Oct. 25, 2010), from www.GameFAQs.com (archived at web.archive.org, Mar. 3, 2012) ("LoL 2010 FAQ"), 19 pages.
IPR2021-00501, Exhibit 1019—League of Legends FAQs, Walkthroughs, and Guides for PC, from www.GameFAQs.com (archived at web.archive.org, Jul. 7, 2011), 2 pages.
IPR2021-00501, Exhibit 1020—League of Legends, from en.Wikipedia.org (archived at web.archive.org, Mar. 7, 2013), 6 pages.
IPR2021-00501, Exhibit 1021—Ryan Scott, the Consensus: League of Legends Review (Nov. 30, 2019), from pc.GameSpy.com (archived at web.archive.org, Jan. 29, 2013 and May 1, 2012), 5 pages.
IPR2021-00501, Exhibit 1022—Todd Kenreck, "League of Legends" Players Log 1 Billion Hours a Month, www.NBCNews.com (archived at web.archive.org, Mar. 5, 2013), 2 pages.
IPR2021-00501, Exhibit 1023—Matt Liebl, League of Legends Wins 2011 Golden Joystick Award for Best Free-to Play Game, www.GameZone.com (archived at web.archive.org, Mar. 13, 2013), 7 pages.
IPR2021-00501, Exhibit 1024—Quintin Smith, League of Legends Review (Nov. 27, 2009), from www.EuroGamer.net (archived at web.archive.org, Mar. 25, 2013), 10 pages.
IPR2021-00501, Exhibit 1025—Matchmaking Changes [Jan. 16, 2013]—League of Legends Community (Aug. 2, 2012), from na.LeagueOfLegends.com (archived at web.archive.org, Jan. 21, 2013), 3 pages.
IPR2021-00501, Exhibit 1026—New AFK Detection for Matchmade Games—League of Legends Community (index and all pages) (Aug. 2—Oct. 25, 2012), from na.LeagueOfLegends.com (archived at web.archive.org, 2012-2020), 42 pages.
IPR2021-00501, Exhibit 1027—8-2 News: Nothing Too Exciting (Aug. 2, 2012), from www.SurrenderAt20.net (archived at web.archive.org, Aug. 12, 2012), 6 pages.
IPR2021-00501, Exhibit 1028-[Call to Action] Help Us Test Matchmakings New AFK Detection League of Legends Community (Jul.

(56) References Cited

OTHER PUBLICATIONS 11-13, 2012), from na.LeagueOfLegends.com (archived at web.archive.org, Jul. 12-16, 2012), 20 pages.
IPR2021-00501, Exhibit 1029—PBE: AFK Players Are Now Kicked Instead of Random'd—League of Legends (Mar. 6, 2013), from GameFAQs.GameSpot.com, with Game Alert screenshot (archived at web.archive.org, Mar. 9, 2013), 6 pages.
IPR2021-00501, Exhibit 1030—New Matchmaking System Yo—League of Legends (Jul. 11, 2012), https://gamefaqs.gamespot.com/boards/954437-league-of-legends/63380249, 4 pages.
IPR2021-00501, Exhibit 1031—Release Notes (index), from na.LeagueOfLegends.com (archived at web.archive.org, Mar. 29, 2013), 2 pages.
IPR2021-00501, Exhibit 1032—Patch 3.5 Notes (Mar. 27, 2013), from na.LeagueaOfLegends.com (archived at web.archive.org, Mar. 31, 2013) ("LoL Patch 3.5 Notes"), 4 pages.
IPR2021-00501, Exhibit 1033—Surrender at 20: Patch 3.5 Notes (Mar. 27, 2013), from www.SurrenderAt20.net (archived at web.archive.org, Mar. 30, 2013), 3 pages.
IPR2021-00501, Exhibit 1034—League of Legends Patch 3.5 Patch Notes (Mar. 28, 2013), from UndergroundDuelists.wordpress.com, 1 pages.
IPR2021-00501, Exhibit 1035—League of Legends Friends Blog Posts (Mar. 2013), from www.Anook.com (archived at web.archive.org, Jun. 1, 2013, with live version of website included for legibility), 21 pages.
IPR2021-00501, Exhibit 1036—Patch 3.5 Notes—League of Legends (Mar. 27, 2013), from GameFAQs.GameSpot.com, 6 pages.
IPR2021-00501, Exhibit 1037—Thank You Riot Yay—League of Legends (Mar. 28, 2013), from GameFAQs.GameSpot.com, 3 pages.
IPR2021-00501, Exhibit 1038—Christopher MacManus, *League of Legends: the World's "Most Played Video Game"* (Oct. 12, 2012), from News.Cnet.com (archived at web.archive.org, Mar. 8, 2013), 2 pages.
IPR2021-00501, Exhibit 1039—League of Legends infographic (archived at web.archive.org, Mar. 29, 2013), 3 pages.
IPR2021-00501, Exhibit 1040—Am I the Only One Whos[e] "Play Again" Button Isn't Working? League of Legends (Nov. 24, 2011), https://gamefaqs.gamespot.com/boards/954437-league-of-legends/61138679, 3 pages.
IPR2021-00501, Exhibit 1041—League of Legends Community (index), from na.LeagueOfLegends.com (archived at web.archive.org, Jul. 19, 2012), 5 pages.
IPR2021-00501, Exhibit 1042—Sign-ups for the Public Beta Environment—League of Legends Community (Aug. 9, 2012), from na.LeagueOfLegends.com (archived at web.archive.org, Sep. 4, 2012), 3 pages.
IPR2021-00501, Exhibit 1043—Saying Farewell to Boards (Mar. 9, 2020), https://na.leagueoflegends.com/en-us/news/community/saying-farewell-to-boards/, 4 pages.
IPR2021-00501, Exhibit 1047—PC Gamer, *Face Off: Is League of Legends a Better Game than Dota 2?*(Feb. 27, 2013), https://www.pcgamer.com/face-off-league-of-legends-vs-dota-2/, 12 pages.
IPR2021-00501, Exhibit 1050—Comprehensive Dota 2 Guide, from SteamCommunity.com (archived at web.archive.org, Feb. 6, 2013) ("Dota 2 Guide"), 41 pages.
IPR2021-00501, Exhibit 1051—Win/Loss/Abandon Feedback, from Dev.Dota2.com (archived at web.archive.org, Nov. 3, 2012) ("Win/Loss/Abandon Feedback"), 7 pages.
IPR2021-00501, Exhibit 1052—Dota 2, from en.Wikipedia.org (archived at web.archive.org, Mar. 24, 2013), 6 pages.
IPR2021-00501, Exhibit 1053—Screenshots from Dota 2 gameplay video (Jan. 8, 2013), 2 pages.
IPR2021-00501, Exhibit 1054—Screenshots from Dota 2 gameplay video (Jun. 6, 2012), with Dota 2 Gameplay—HD, from www.YouTube.com (archived at web.archive.org, Aug. 26, 2012), 9 pages.
IPR2021-00501, Exhibit 1055—Dota 2 Server Information and Discussion (Nov. 26-27, 2012), from Dev.Dota2.com, 6 pages.
IPR2021-00501, Exhibit 1056—South East Asia and China Server Information (Nov. 29—Dec. 1, 2011), from Dev.Dota2.com, 5 pages.
IPR2021-00501, Exhibit 1057—Transitioning Into Launch Mode (Jun. 21, 2013), from Blog.Dota2.com (archived at web.archive.org, Jun. 24, 2013), 3 pages.
IPR2021-00501, Exhibit 1058—Matchmaking, from www.Dota2Wiki.com (archived at web.archive.org, May 17, 2013), 3 pages.
IPR2021-00501, Exhibit 1059—Dota 2—Knowledge Base—Steam Support, from Support.SteamPowered.com (archived at web.archive.org, Apr. 23, 2013), 2 pages.
IPR2021-00501, Exhibit 1060—News—Dota 2 Update Released (Nov. 3, 2011), from Store.SteamPowered.com (archived at web.archive.org, Nov. 5, 2011), 2 pages.
IPR2021-00501, Exhibit 1061—News—Dota 2 Update Released (Dec. 1, 2011), from Store.SteamPowered.com (archived at web.archive.org, Dec. 26, 2011), 3 pages.
IPR2021-00501, Exhibit 1062—the Crusade Continues (Nov. 3, 2011), from Blog.Dota2.com (archived at web.archive.org, Feb. 26, 2012), 2 pages.
IPR2021-00501, Exhibit 1063—Commend/Report/Ban Feedback (Feb. 23-Aug. 1, 2012), from Dev.Dota2.com (archived at web.archive.org, Nov. 3, 2012), 4 pages.
IPR2021-00501, Exhibit 1064—Common Discussions—Do Not Open New Threads About These Issues (Dec. 3, 2011), from Dev.Dota2.com (archived at web.archive.org, Nov. 3, 2012), 2 pages.
IPR2021-00501, Exhibit 1065—Dota2 Dev, from Dev.Dota2.com (archived at web.archive.org, Nov. 27, 2012), 2 pages.
IPR2021-00501, Exhibit 1066—Misc (index), from Dev.Dota2.com (archived at web.archive.org, Nov. 5, 2012), 3 pages.
IPR2021-00501, Exhibit 1067—Protip: Wait 5+ Minutes Before You Queue Again—Dota 2 (May 18, 2014), from GameFAQs.GameSpot.com, 4 pages.
IPR2021-00501, Exhibit 1068—Surrendering in Dota (Nov. 8, 2012), https://www.liquiddota.com/ forum/dota-2-general/453646-surrendering-in-dota, 4 pages.
IPR2021-00501, Exhibit 1069—Kris Graft, *Stardock Reveals Impulse, Steam Market Share Estimates* (Nov. 19, 2009), from www.Gamasutra.com (archived at https://web.archive.org, Apr. 11, 2011), 3 pages.
IPR2021-00501, Exhibit 1070—Steam Surpasses 30 Million Account Mark (Oct. 18, 2010), from Store.SteamPowered.com (archived at https://web.archive.org, Apr. 27, 2011), 2 pages.
IPR2021-00501, Exhibit 1071—Welcome to Valve, from www.ValveSoftware.com (archived at https:// web.archive.org, Aug. 25, 2012), 2 pages.
IPR2021-00501, Exhibit 1072 - Keza MacDonald, *IGN People's Choice Award: and the Winner Is* . . . (Aug. 23, 2011), from www.IGN.com (archived at https://web.archive.org, Mar. 25, 2013), 4 pages.
IPR2021-00501, Exhibit 1073—The PC Gamer 2012 Game of the Year Nominees (Dec. 11, 2012), from www.PCGamer.com (archived at https://web.archive.org/, Apr. 3, 2013), 6 pages.
IPR2021-00501, Exhibit 1074—Steam Community: Dota 2, home search p., from SteamCommunity.com (archived at web.archive.org, Apr. 20, 2013), 2 pages.
IPR2021-00501, Exhibit 1075—Steam Community: Guides, from SteamCommunity.com (archived at web.archive.org, Feb. 16, 2013), 2 pages.
IPR2021-00501, Exhibit 1076—Valve Press Release, *Steam Guides Available Now* (Jan. 17, 2013), from Store.SteamPowered.com (archived at web.archive.org, Mar. 17, 2013), 2 pages.
IPR2021-00501, Exhibit 1077—Steam Community: Dota 2 Guides, Top Rated, from SteamCommunity.com (archived at web.archive.org, May 17, 2013), 4 pages.
IPR2021-00501, Exhibit 1079—Comprehensive Dota 2 Guide, from SteamCommunity.com (archived at web.archive.org, Nov. 24, 2013), 56 pages.
IPR2021-00501, Exhibit 1080—Comprehensive Dota 2 Guide, from SteamCommunity.com (archived at web.archive.org, Jul. 15, 2013), 44 pages.

(56) References Cited

OTHER PUBLICATIONS

IPR2021-00501, Exhibit 1081—Dota Team, Unleashed at Last! (Dec. 2, 2011), from Blog.Dota2.com (archived at web.archive.org, Jan. 7, 2012), 2 pages.

IPR2021-00501, Exhibit 1082—Wayback Machine General Information, https://help.archive.org/hc/en-us/articles/360004716091-Wayback-Machine-General-Information (last visited Jan. 3, 2021), 4 pages.

IPR2021-00501, Exhibit 1083—Using the Wayback Machine, https://help.archive.org/hc/en-us/articles/360004651732-Using-The-Wayback-Machine (last visited Jan. 3, 2021), 5 pages.

IPR2021-00501, Exhibit 1084—Dota 2 on Steam, from Store.SteamPowered.com (archived at web.archive.org, Feb. 7, 2013), 3 pages.

IPR2021-00501, Exhibit 1085—Steam Community Hub—Dota 2, from SteamCommunity.com (archived at web.archive.org, May 1, 2013), 1 pages.

IPR2021-00501, Exhibit 1086—Valve Software Jobs, from www.ValveSoftware.com (archived at web.archive.org, Feb. 15, 2013), 2 pages.

IPR2021-00501, Exhibit 1087—Valve Software Jobs Postings, from www.ValveSoftware.com (archived at web.archive.org, Feb. 18, 2013), 2 pages.

IPR2021-00501, Exhibit 1088—How the Cooldown Abandon Works (Jul. 25, 2012), https://dev.dota2.com/forum/dota-2/misc/49918-how-the-cooldown-abandon-works, 5 pages.

IPR2021-00501, Exhibit 1089—Dota 2 Update (Jul. 26, 2012), from Store.SteamPowered.com (archived at web.archive.org, Jul. 27, 2012), 2 pages.

IPR2021-00501, Exhibit 1090—Added a Cooldown to Being Able to Find a Match When a Player Declines . . . (Jul. 25, 2012), https://gamefaqs.gamespot.com/boards/610657-dota-2/63521578, 3 pages.

IPR2021-00501, Exhibit 1091—Surrender at 20: RiotKiddington Explains Queue Dodging (Feb. 11, 2013), from www.SurrenderAt20.net (archived at web.archive.org, Feb. 13, 2013), 3 pages.

IPR2021-00501, Exhibit 1092—Dodge Penalty = Reward Idiots, Penalize People Who Care League of Legends Community, from na.LeagueOfLegends.com (archived at web.archive.org, Feb. 15, 2013), 7 pages.

IPR2021-00501, Exhibit 1093—League of Legends—What are the Penalties for Leaving the Game or Surrendering? — Arqade, from Gaming.StackExchange.com (archived at web.archive.org, May 12, 2013), 2 pages.

* cited by examiner

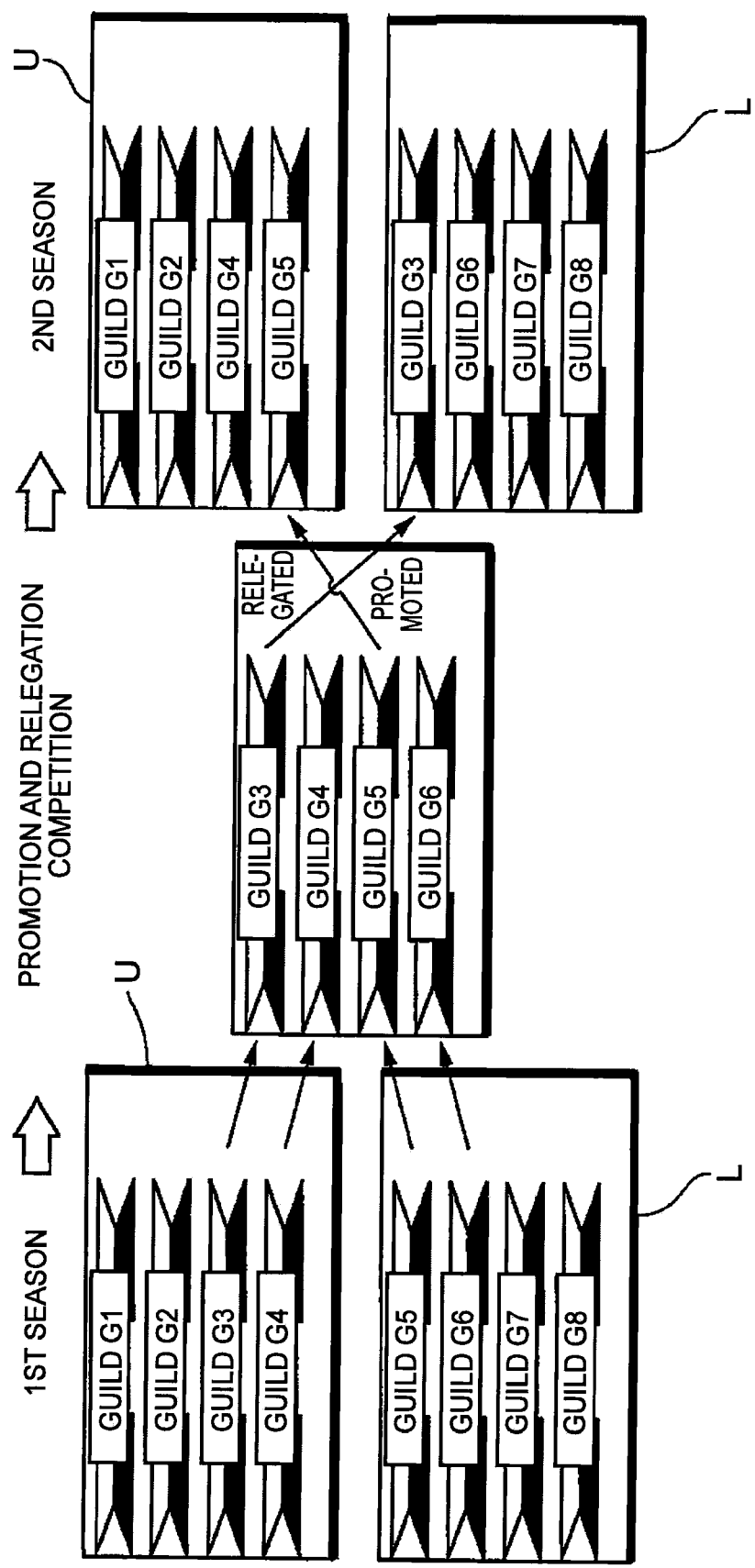

FIG. 4

| SCHEDULE | MON. SEASON COMPETITION | TUE. SEASON COMPETITION | WED. SEASON COMPETITION | THU. SEASON COMPETITION | FRI. SEASON COMPETITION | SAT. SEASON COMPETITION | SUN. PROMOTION AND RELEGATION COMPETITION |
|---|---|---|---|---|---|---|---|
| | DAY BATTLE | DAY BATTLE | DAY BATTLE | DAY BATTLE | DAY BATTLE | DAY BATTLE | DAY BATTLE |
| | EVENING BATTLE | EVENING BATTLE | EVENING BATTLE | EVENING BATTLE | EVENING BATTLE | EVENING BATTLE | EVENING BATTLE |
| | NIGHT BATTLE | NIGHT BATTLE | NIGHT BATTLE | NIGHT BATTLE | NIGHT BATTLE | NIGHT BATTLE | NIGHT BATTLE |

FIG. 9

MY LORD! ALLIANCE HAS BEEN
DISBANDED WHILE YOU WERE AWAY
FROM BATTLE FRONT.
HOWEVER, ODDS OF WAR ARE STILL HIGH,
AND YOU MAY BE REQUESTED
TO JOIN NEIGHBORING ALLIANCE.
TILL THEN, YOU SHALL MOVE ON
AND SOLIDIFY FOUNDATION!

FIG. 13

MY LORD! THE WORLD IS TURBULENT,
AND THIS LAND CANNOT ESCAPE
FROM CHAOS OF WAR.
WE SHALL COOPERATE WITH
NEIGHBORING COUNTRIES
TO SURVIVE THIS WAR-TORN ERA.

GAME CONTROL METHOD, SERVER DEVICE, GAME SYSTEM, AND COMPUTER-READABLE RECORDING MEDIUM

CROSS-REFERENCE TO RELATED APPLICATIONS

This application is a continuation of U.S. patent application Ser. No. 16/035,368, filed Jul. 13, 2018, which is a continuation of U.S. patent application Ser. No. 15/363,435, filed Nov. 29, 2016, now U.S. Pat. No. 10,039,977, which is a continuation of U.S. patent application Ser. No. 14/309,814, filed Jun. 19, 2014, now U.S. Pat. No. 9,539,517, which claims priority benefit of Japanese Patent Application No. 2013-130237, filed Jun. 21, 2013, Japanese Patent Application No. 2013-257677, filed Dec. 13, 2013, and Japanese Patent Application No. 2014-046141, filed Mar. 10, 2014, the disclosures of which are incorporated herein in their entirety by reference.

BACKGROUND

Disclosed herein are a game control method, a server device, a game system, and a computer-readable recording medium.

Social games provided using social networking services (hereafter abbreviated as "SNS") are attracting close attention in recent years, against a backdrop of significant progress in the information and communication fields such as fast wireless communication, sophisticated communication terminals, and proliferation of clouds. A social game has a feature that users communicating via an SNS can enjoy the game or users can communicate with each other through the game.

As a social game utilizing this property of SNS, for example, JP2012-53640 A proposes a system in which players who participate in a game fight a battle or the like unfolding in the game. In JP2012-53640 A, an individual battle in which a plurality of players fight one on one and a team battle in which a plurality of players are split into two teams to fight each other are disclosed as battle types in the social game.

In the team battle, how to keep the players from losing their motivation for the game, that is, how to motivate the players to participate in the team battle, is very important. Like a soccer league competition, a typical example is that leagues are formed according to the performance of each team (e.g. the win-loss record of each team) and, depending on wins and losses throughout a season (e.g. one week), a promotion and relegation competition between the leagues is performed for league reorganization and the like (hereafter this is simply referred to as "league competition").

SUMMARY

By employing the above-mentioned league competition, it is possible to motivate the players belonging to each team to participate in the battle. However, the following problem has been pointed out: in the case where a team in the same league does not participate in the battle (e.g. there is no attack from the team even after entering a battle mode), the players of its opponent team cannot feel the thrill of the game attained by repeating offense and defense between teams and the player solidarity attained through teamwork and the like, and lose their motivation to participate in the game.

The invention has been made in view of the circumstances described above, and has an object of realizing a game control method, a server device, a game system, and a computer-readable recording medium for providing a social game that can increase the fun and amusement of a team battle to make the whole game more active and enhance players' motivation to participate in or continue the game by suppressing an occurrence of any non-participation team not participating in the battle.

To solve the stated problem, a game control method according to embodiments of the invention is a game control method performed by a server device for providing a battle game between groups, to each of which a plurality of players belong, to a terminal device operated by each player via a communication line, the game control method comprising: a determination step of determining an activity status of each group, based on a criterion for determining whether the activity status of the group is an active state or an inactive state; and a group integrated control step of disbanding a group determined to be in the inactive state in the determination step.

The "player" is a user who operates the terminal device, and represents a concept that corresponds to a client in a client-server system. The term "player" is used here, to distinguish it from a user (e.g. server administrator) of the server device. Typically, the player can participate in the game through a character who acts, moves, thinks, and the like in a virtual game space on behalf of the player and an appropriate game medium associated with the character (hereafter they are collectively referred to as "player character"). As disclosed herein, the term "player" simply used in the following description may sometimes indicate the player character in a precise sense.

The "group" is, for example, a common name for a variety of virtual collections each having a plurality of members, such as "guild", "party", "team", and "community". The group may be created or formed on a game title basis, or created or formed on a platform basis or the like as a common group or a shared group across a plurality of game titles.

In the determination step, the activity status of each guild is recognized by determining whether the guild is in the active state or the inactive state. In the case where it is determined that the activity of the guild is not detected on the ground that, for example, its participation in the guild battle is not detected, the guild is forcibly disbanded by a group integrated control unit. This can prevent the present problem, i.e. the problem in that the players cannot feel the fun and thrill of the guild battle and lose their motivation to participate in or continue the game because, even after the start time of the guild battle is reached, there is no opponent guild or the opponent guild makes no attack.

The above-mentioned criterion may be at least any of: (1) the group has no battle against another group for a predetermined period or more; (2) no login to the battle game is performed by any player belonging to the group for a predetermined period or more; and (3) the number of players belonging to the group is below a predetermined number for a predetermined period or more. The use of such a criterion enables reliably determination of whether the guild is in the active state or the inactive state.

Moreover, the group integrated control step preferably comprises: a specification step of specifying each player belonging to the disbanded group, using group-player correspondence information indicating correspondence relations between groups and players; and a notification step of notifying a terminal device of each specified player, of the disbandment of the group. With such a structure, for example, each player belonging to the forcibly disbanded guild can recognize that the guild has been disbanded and he or she has become an independent player, when performing login to access his or her My Home screen for the first time after the forcible disbandment.

Another game control method according to embodiments of the invention is a game control method performed by a server device for providing a battle game between groups, to each of which a plurality of players belong, to a terminal device operated by each player via a communication line, the game control method including: a determination step of determining, by detecting an activity status of an independent player not belonging to any group and comparing a result of the detection with player determination information relating to the independent player, whether or not to acknowledge the independent player as a candidate for a player belonging to a new group; and a creation step of creating the new group, in the case where a parameter relating to independent players each acknowledged as the candidate for the player belonging to the new group satisfies a setting condition.

With such a structure, for example, whether or not to acknowledge the independent player as the candidate for the player belonging to the new guild is determined, where the independent player is an independent player (new player) who has newly started the game or an independent player (returning player) who belonged to a disbanded guild. In the case where acknowledged independent players satisfy the setting condition (e.g. the number of acknowledged independent players is greater than or equal to 6), the new guild is formed. By acknowledging players who are expected to have high motivation for the guild battle each as the candidate for the player belonging to the new guild, the problem of losing motivation to participate in or continue the game can be prevented.

Here, it is preferable that the parameter relating to the independent players is the number of independent players and, in the creation step, the new group is created in the case where the number of independent players each acknowledged as the candidate for the player belonging to the new group is greater than or equal to a specified number (e.g. 6).

Moreover, it is preferable that the player determination information is game progress information or game score information. Thus, different criteria for acknowledging as the candidate for the player belonging to the new group may be used between the new player and the returning player. In particular, the game progress varies among returning players. It is therefore desirable to determine whether or not to acknowledge the returning player as the candidate based on the game score as mentioned above.

A server device according to embodiments of the invention is a server device for providing a battle game between groups, to each of which a plurality of players belong, to a terminal device operated by each player via a communication line, the server device comprising: a storage unit for storing a criterion for determining whether an activity status of a group is an active state or an inactive state; a determination unit for determining the activity status of each group based on the criterion; and a group integrated control unit for disbanding a group determined to be in the inactive state by the determination unit.

Another server device according to embodiments of the invention is a server device for providing a battle game between groups, to each of which a plurality of players belong, to a terminal device operated by each player via a communication line, the server device comprising: a storage unit for storing player determination information relating to an independent player not belonging to any group; a determination unit for determining, by detecting an activity status of the independent player and comparing a result of the detection with the player determination information, whether or not to acknowledge the independent player as a candidate for a player belonging to a new group; and a creation unit for creating the new group, in the case where a parameter relating to independent players each acknowledged as the candidate for the player belonging to the new group satisfies a setting condition.

A program according to embodiments of the invention is a program for causing a computer for providing a battle game between groups, to each of which a plurality of players belong, to a terminal device operated by each player via a communication line, to realize: a determination function of determining an activity status of each group, based on a criterion for determining whether the activity status of the group is an active state or an inactive state; and a group integrated control function of disbanding a group determined to be in the inactive state by the determination function.

Another program according to embodiments of the invention is a program for causing a computer for providing a battle game between groups, to each of which a plurality of players belong, to a terminal device operated by each player via a communication line, to realize: a determination function of determining, by detecting an activity status of an independent player not belonging to any group and comparing a result of the detection with player determination information relating to the independent player, whether or not to acknowledge the independent player as a candidate for a player belonging to a new group; and a creation function of creating the new group, in the case where a parameter relating to independent players each acknowledged as the candidate for the player belonging to the new group satisfies a setting condition.

According to embodiments of the invention, a game with a more active guild battle can be provided by forcibly disbanding a guild whose activity is not detected.

BRIEF DESCRIPTION OF THE DRAWINGS

FIG. 3 is a conceptual diagram for describing an overview of a battle league;

FIG. 4 is a conceptual diagram for describing a schedule of the battle league;

FIG. 9 is a schematic diagram showing an example of a disbandment message;

FIG. 13 is a schematic diagram showing an example of a formation message.

DETAILED DESCRIPTION

Figure 1:
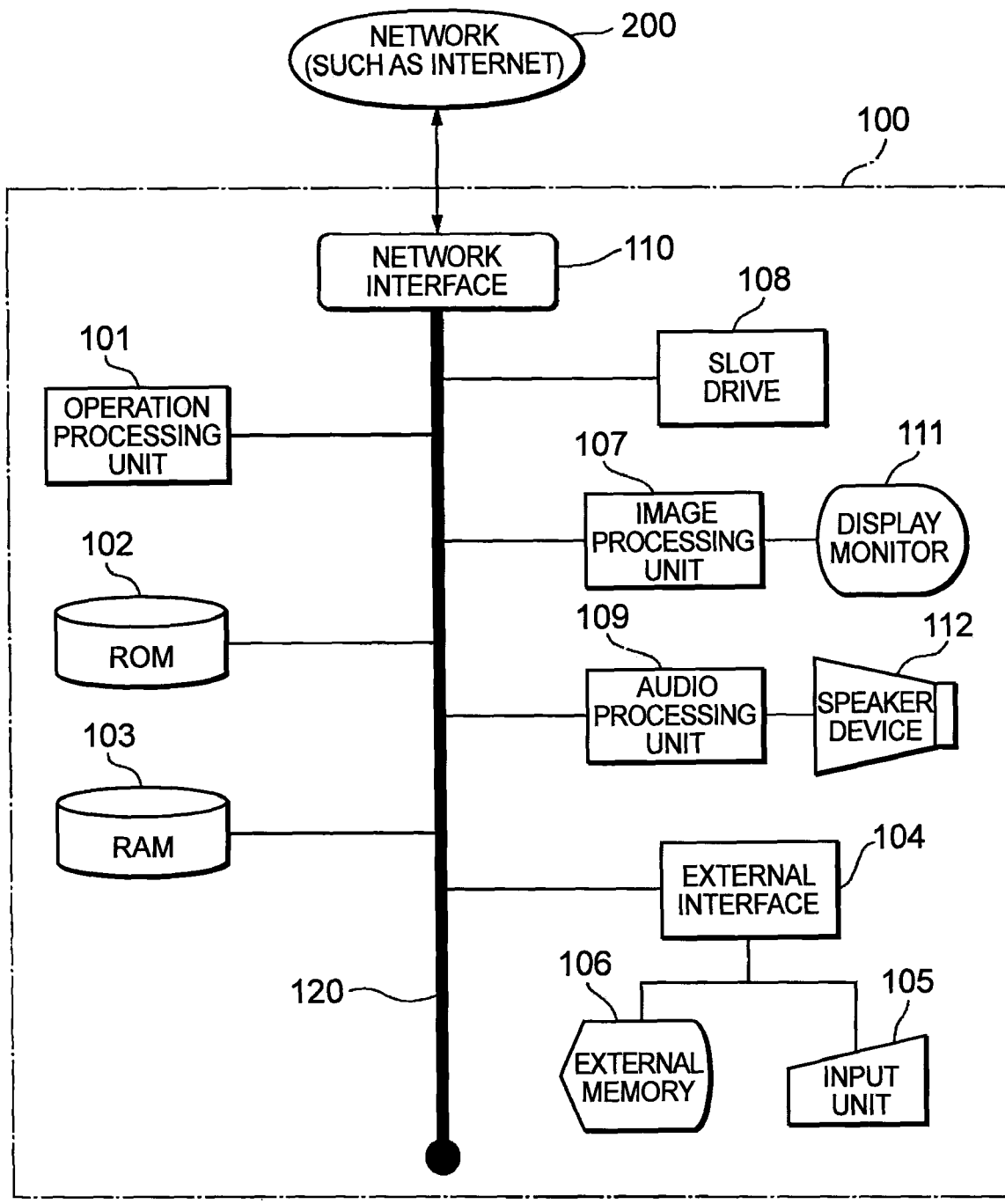
FIG. 1 is a schematic diagram (system block diagram) showing a preferred embodiment of a server device according to the invention.

The following describes an embodiment of the invention in detail. The following embodiment is merely illustrative of the invention, and the invention should not be limited to the embodiment. Various modifications are possible in the invention, without departing from the scope of the invention. Moreover, a person skilled in the art can adopt any embodiment in which one or more elements described below are replaced with their equivalents, and such an embodiment is also included within the scope of the invention. The positional relationships such as up, down, left, and right shown according to need are based on the positional relationships shown in the drawings, unless stated otherwise. The dimensional ratios in the drawings are not limited to the ratios shown in the drawings. Though the following describes, as an example, an embodiment in which the invention is implemented using an information processing device for a game to facilitate understanding, this is not a limit for the invention as noted above.

A. Embodiment

A-1. Structure of Game System

Figure 2:
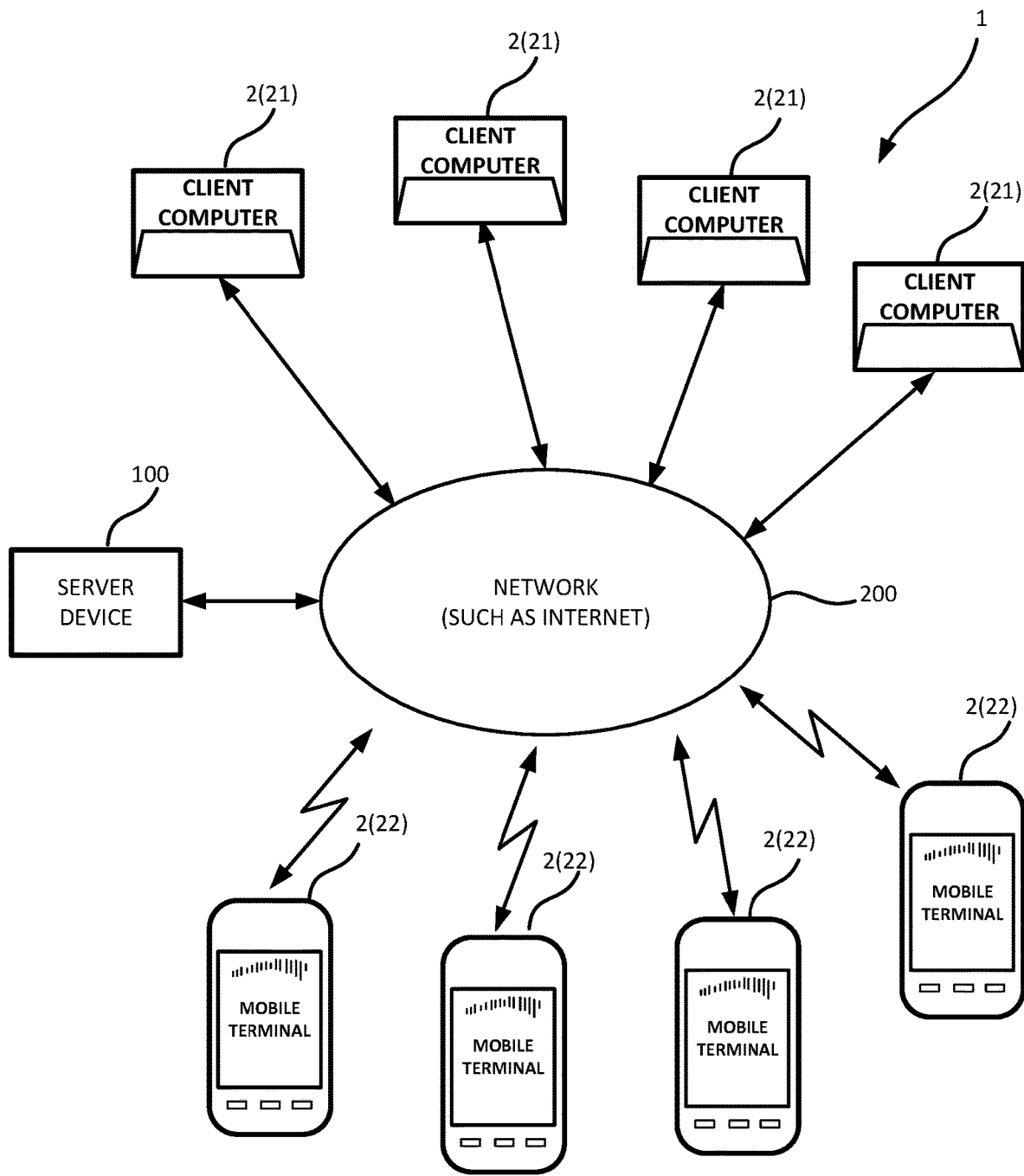
FIG. 2 is a schematic diagram (system diagram) showing a preferred embodiment of a game system according to the invention.
Figure 5:
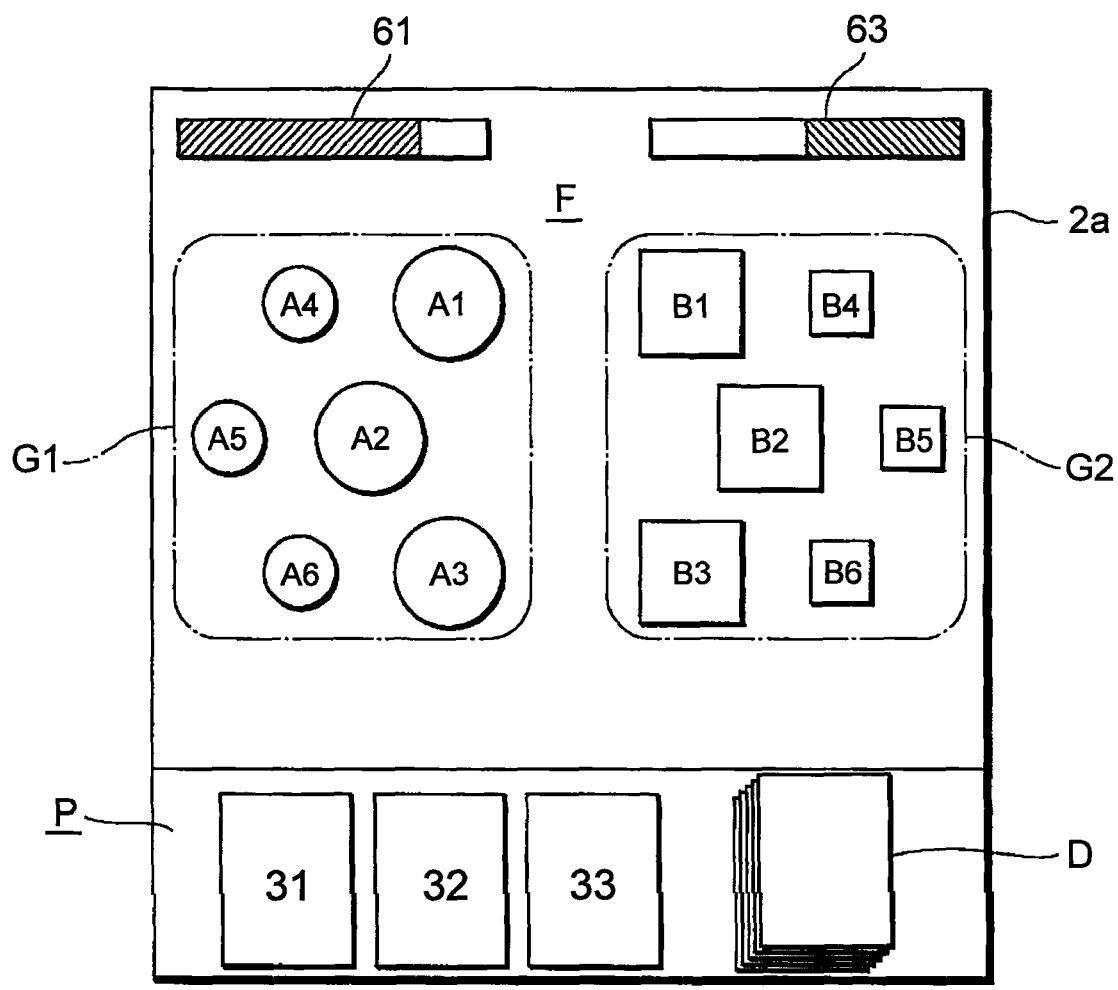
FIG. 5 is a schematic diagram showing an example of a structure of a game screen.

FIG. 1 is a schematic diagram (system block diagram) showing a preferred embodiment of a server device according to the present invention. FIG. 2 is a schematic diagram (system diagram) showing a preferred embodiment of a game system according to the invention. As shown in FIGS. 1 and 2, a server device 100 is a server computer connected to a network 200, and achieves a server function by a predetermined server program running in the server computer. Each terminal device 2 such as a client computer 21 or a mobile terminal 22 is wiredly and/or wirelessly connected to the network 200, as with the server device 100. The server device 100 and the terminal device 2 are set to be capable of communicating with each other, thus constituting a game system 1.

The network 200 is a communication line or a communication network for information processing including the Internet and the like. The specific structure of the network 200 is not particularly limited so long as it enables data transmission and reception between the server device 100 and the terminal device 2. For example, the network 200 comprises a base station wirelessly connected to the terminal device 2, a mobile communication network connected to the base station, the Internet connected to the server device 100, and a gateway device for connecting the mobile communication network and the Internet.

The server device 100 comprises an operation processing unit 101 such as a CPU or an MPU, a ROM 102 and a RAM 103 as storage devices, an external interface 104 connected with an input unit 105 and an external memory 106, and an image processing unit 107 connected with a display monitor 111. The server device 100 further comprises a slot drive 108 containing or connected with a disk, a memory device, and the like, an audio processing unit 109 connected with a speaker device 112, and a network interface 110, which are connected to each other via a transmission path 120 such as a system bus including an internal bus, an external bus, and an expansion bus as an example. Note that devices used for input/output such as the input unit 105, the external memory 106, the display monitor 111, and the speaker device 112 may be omitted according to need and, even in the case of being included, need not be constantly connected to the transmission path 120.

The operation processing unit 101 controls the overall operation of the server device 100, transmits and receives control signals and information signals (data) with the other components mentioned above, and also performs various operations necessary for game execution. The operation processing unit 101 is accordingly capable of performing, through the use of an arithmetic logic unit and the like, arithmetic operations such as addition, subtraction, multiplication, and division, logical operations such as logical addition, logical multiplication, and logical negation, bit operations such as bit addition, bit multiplication, bit inversion, bit shift, and bit rotation, and the like, on fast-accessible storage areas such as registers. The operation processing unit 101 is further capable of performing saturate operations, trigonometric function operations, vector operations, and the like, according to need.

The ROM 102 stores an IPL (Initial Program Loader), which is typically executed immediately after power-on. By executing the IPL, the operation processing unit 101 reads, into the RAM 103, a server program and a game program recorded in the disk or the memory device contained in or connected to the slot drive 108, and executes the programs. The ROM 102 also stores an operating system program necessary for controlling the overall operation of the server device 100 and other various data.

The RAM 103 is for temporary storage of the server program, the game program, and various data. The read server program and game program, data necessary for game progress and communication between a plurality of terminal devices 2, and the like are held in the RAM 103, as mentioned above. The operation processing unit 101 sets a variable area in the RAM 103, and performs an operation directly on a value stored in the variable area using the arithmetic logic unit. The operation processing unit 101 also performs a process such as copying or moving a value stored in the RAM 103 to a register to store the value in the register and performing an operation directly on the register, and writing the operation result back to the RAM 103.

The input unit 105 which is connected via the external interface 104 receives various operation inputs by the user (game provider) of the server device 100. The input unit 105 may be any of a keyboard, a touchpad, a touch panel, a voice input device, and the like. The device type is not particularly limited so long as various operation inputs and instruction inputs for a decision operation, a cancel operation, a menu display, and the like are possible.

The RAM 103 or the external memory 106 which is removably connected via the external interface 104 stores data indicating the operation status of the server device 100, the access status of each terminal device 2, and the play status and progress state (past results, etc.) of the game in each terminal device 2, data of communication logs (records) between the terminal devices 2, and so on, in a rewritable form.

The image processing unit 107, after various data read from the slot drive 108 is processed by the operation processing unit 101 or the image processing unit 107, stores the processed image information in a frame memory or the like. The image information stored in the frame memory is converted to a video signal at predetermined synchronization timing, and output to the display monitor 111 connected with the image processing unit 107. This enables various image displays. Image information related to the game is transmitted from the image processing unit 107 and/or the operation processing unit 101 to each terminal device 2, for example in cooperation with the operation processing unit 101.

The audio processing unit 109 converts various data read from the slot drive 108 to an audio signal, and outputs the audio signal from the speaker device 112 connected with the audio processing unit 109. Audio information (sound effects, music information) related to the game is transmitted from the audio processing unit 109 and/or the operation processing unit 101 to each terminal device 2, for example in cooperation with the operation processing unit 101.

The network interface 110 connects the server device 100 to the network 200. For example, the network interface 110 conforms to a standard used for building a LAN, and includes: an analog modem, an ISDN modem, an ADSL modem, a cable modem for connecting to the Internet or the like using a cable television line, or the like; and an interface for connecting the modem to the operation processing unit 101 via the transmission path 120. The following describes a preferred embodiment of a game (social game) executed by a game program according to the invention in the game system 1 and the server device 100 having the above-mentioned structures.

A-2. Game Content FIG. 3 is a conceptual diagram for describing an overview of a battle league according to an embodiment of the invention. FIG. 4 is a conceptual diagram for describing a schedule of the battle league.

As shown in FIG. 3, the battle league is organized (an upper league U and a lower league L) according to performance in terms of strength (e.g. past battle records), and reorganized as a result of a promotion and relegation competition performed after a season competition.

A player who participates in this game first joins a group called "guild" which is made up of a plurality of players. According to the schedule of the battle league (see FIG. 4), the guild to which the player belongs sequentially fights other guilds in the same league and, in some cases, fights other guilds in the other league in the promotion and relegation competition, thus seeking to win the crown of all guilds.

This is described in detail below. Suppose the player belongs to a guild G3 shown in FIG. 3. The player sequentially fights other guilds G1, G2, and G4 in the upper league U. For example, in the case where the guilds G3 and G4 are lower in winning rate than the guilds G1 and G2 in the upper league U at the end of the 1st season, the guild G3 moves into the promotion and relegation competition together with the guild G4, and fights other guilds G5 and G6 having high winning rates in the lower league L. In the case where the guild G3 to which the player belongs is lower in winning rate than the guilds G4 and G5 in the promotion and relegation competition, too, i.e. in the case where the guild G3 cannot make the top two of the four guilds participating in the promotion and relegation competition, the guild G3 will end up being in the lower league L in the 2nd season (see FIG. 3). In such a case, the guild G3 fights other guilds G6, G7, and G8 in the lower league L, aiming to return to the upper league U in the next season (i.e. the 3rd season).

The schedule of the battle league is shown in FIG. 4 as an example. The "season competition" of fighting another guild in the same league is held on weekdays (Monday to Friday), and the "promotion and relegation competition" of fighting another guild across the leagues is held on weekends (Saturday and Sunday). The season competition and the promotion and relegation competition are each performed a plurality of times in predetermined time periods each day (see "day battle", "evening battle", and "night battle" shown in FIG. 4). Especially in the promotion and relegation competition, the players belonging to each guild are likely to be even more motivated for their battle against another guild than in the season competition, because they face either a chance of being promoted to the upper league or a risk of being relegated to the lower league. Accordingly, the days (i.e. weekends) on which each player is likely to be more easily participate in the game are assigned to the promotion and relegation competition in this embodiment, as shown in FIG. 4. Note that the schedule of the promotion and relegation competition and the season competition, the time period assigned to each battle, and the like may be appropriately set or changed according to the game design and the age group of players. The league organization (the number of leagues, the maximum number of guilds per league, etc.) may also be appropriately set or changed by, for example, a game operator managing the game. The following describes a method of game play by each player and a method of game progress-related control by the server device 100, with reference to FIGS. 1 to 5 and the like.

A-3. Game Procedure

First, the player operates the terminal device 2 (the client computer 21 or the mobile terminal 22, e.g. a tablet terminal or a smartphone), to connect the terminal device 2 to the server device 100 via the network 200 such as the Internet. The player then operates the terminal device 2 to select the game provided by the server device 100 or, in a platform screen prior to game selection, inputs login information such as an ID number and a password. Having recognized the login information, the operation processing unit 101 in the server device 100 displays the player's unique My Page screen or My Home screen associated with the ID number, on the terminal device 2. Depending on the game type, a banner listing a plurality of scenes (e.g. locations, dungeons, quests, etc.) set as game scenes is displayed in the My Page screen. The scenes such as locations, dungeons, and quests may be mutually or individually hierarchized.

Moreover, in this game, the operation processing unit 101 in the server device 100 displays a menu screen about the above-mentioned "guild" which is a group of players, in the My Page screen or the My Home screen. A player who has played the game or participated in the game basically belongs to a predetermined guild. This information is stored in a storage unit such as the ROM 102, in association with specific information such as the ID information of the player. In other words, guild-player correspondence information indicating correspondence relations between guilds and players and the like are stored in the storage unit. Based on this information, the operation processing unit 101 displays information of the guild to which the player belongs and, if necessary, an edit menu and the like for the guild, on the terminal device 2.

On the other hand, a player (i.e. a new player) who plays the game or participates in the game for the first time basically does not belong to any specific guild. The operation processing unit 101 accordingly displays a menu screen for searching for (finding) a guild or creating (establishing) a new guild, on the terminal device 2 of the new player not belonging to any guild. The new player can decide or create a guild to which he or she belongs, by operating the terminal device 2 according to instructions in pull-down menus and the like sequentially displayed from the menu screen. Alternatively, the new player or the like may proceed with the game without joining any guild and, during this, may be invited by an existing guild. In such a case, an invitation message is displayed on the terminal device 2 of the new player. The new player can join the inviting guild, by operating the terminal device 2 according to the message displayed on the display screen.

When the guild to which the player belongs is decided or selected or when necessary, a list of a plurality of games or events is displayed on the terminal device 2. When the player selects to participate in the game, the screen of the game held at the time is displayed on the terminal device 2 of the player. Thus, the player can freely participate in the game held at the time. Here, a preparation screen or an introduction screen of various games may be displayed on the terminal device 2 of the player, as a still image or a moving image (e.g. Flash).

While the guild battle league is being held, the execution of the guild battle is controlled by the server device 100 according to the schedule shown in FIG. 4, as mentioned earlier. The following describes an example of display on the terminal device 2 of each player when the guild battle between the guilds G1 and G2 is performed, with reference to FIG. 5.

A-4. Guild Battle

When the guild battle is performed, a field F and a palette P are displayed as game image display areas on a screen 2a of the terminal device 2 of each player, and elements are displayed in each display area. In an example shown in FIG. 5, player characters A1 to A6 belonging to the guild G1 (group) and player characters B1 to B6 belonging to the guild G2 (group) are displayed in the field F, as part of the elements. In the guild battle, the player characters A1 to A6 belonging to the guild G1 and the player characters B1 to B6 belonging to the guild G2 are each unified in making an attack and the like on the opponent guild at arbitrary timing, and fight in the form of competing in total points earned (points earned by damaging the opponent, etc.).

Offense, defense, and the like against the opponent guild are conducted as follows. First, each player belonging to the offensive guild (e.g. the guild G1 shown in FIG. 5) sequentially selects (turns over) cards from a deck D in the palette P. The player thus attacks the player characters B1 to B6 of the opponent guild G2 according to the combination of skills, attack values, specific items, defense values, and the like shown in cards 31, 32, and 33 and their attributes, rarity, and the like. Damage inflicted on the opponent and damage inflicted on the player character are then calculated. For example, in the case where the cards 31, 32, and 33 all match in type, attribute, or rarity or constitute a specific combination, the offensive power or defensive power of the player characters A1 to A6 may be increased. In the case where the guild G2 is the offensive guild, on the other hand, the same display is made on the screen 2a of the terminal device 2 of each player belonging to the offensive guild G2, and the player attacks the player characters A1 to A6 of the opponent guild G1. During the guild battle, active items (e.g. a drug for recovery from damage, not shown in the drawing) and the like used in each of the guilds G1 and G2 are also displayed in the event field F on the screen 2a. Further, HP gauges 61 and 63 are displayed respectively for the guilds G1 and G2, and the outcome of the battle is determined according to the remaining amount of each of the HP gauges 61 and 63.

Thus, in the guild battle, the players belonging to each of the guilds G1 and G2 are unified in repeated offense and defense and compete fiercely against their opponents, with it being possible to feel the fun and thrill of the battle game.

However, in the case where the opponent guild does not participate in the battle (that is, the opponent guild does not take any attack action despite the time of the guild battle being reached), the players belonging to the offensive guild might find the game not interesting at all and lose their motivation to participate in or continue the game, as mentioned earlier (see the SUMMARY OF THE INVENTION section).

Figure 6:
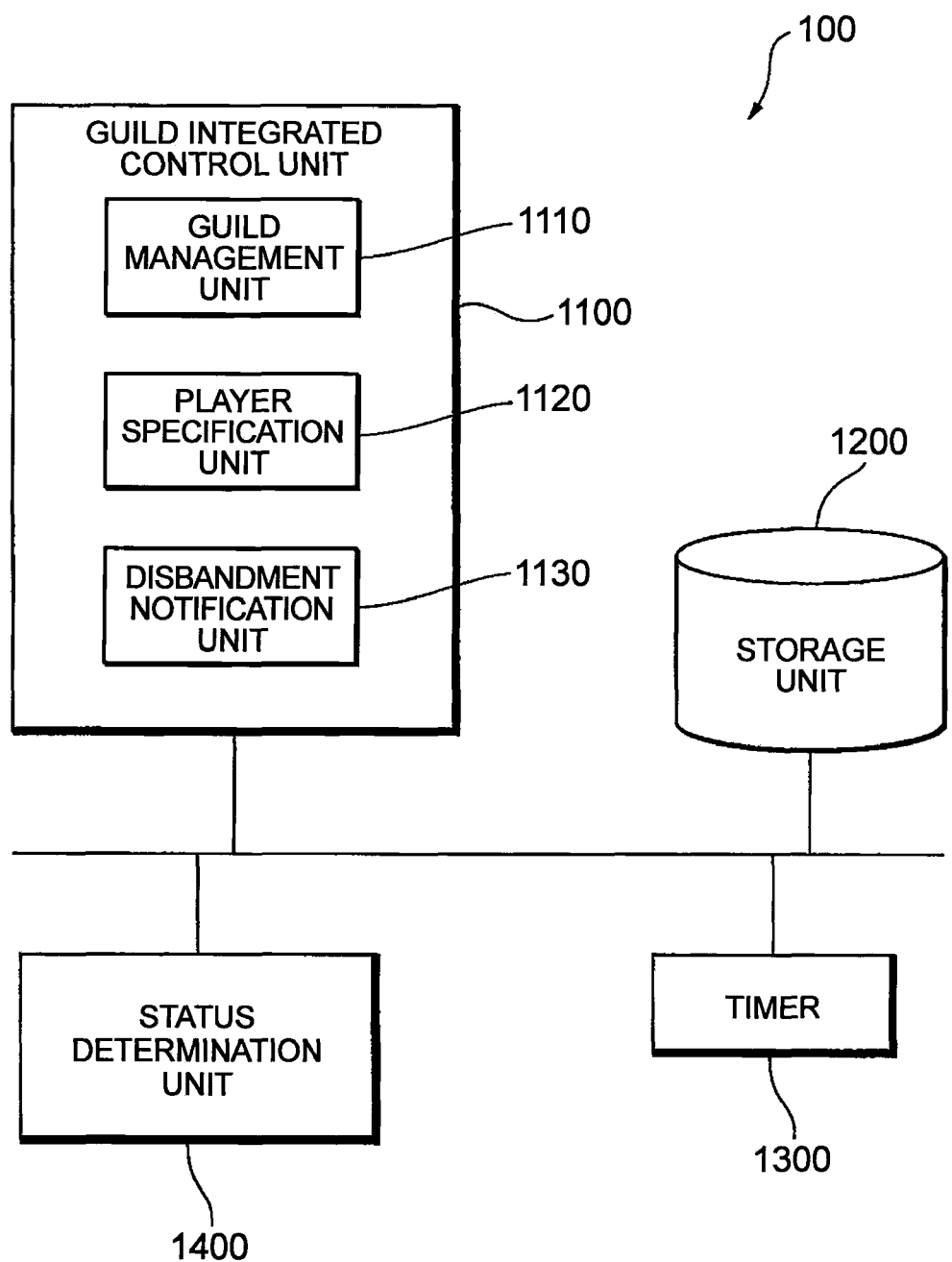
FIG. 6 is a functional block diagram showing a guild forcible disbandment function by the server device.

In view of this, in embodiments of the invention, the server device 100 recognizes the activity status of each guild joining the battle league, and forcibly disbands any guild whose activity is not detected for a predetermined period, thereby enabling all players participating in the guild battle to feel the fun and thrill of the guild battle. The following describes a specific method of achieving such guild forcible disbandment, with reference to FIG. 6 and the like. A guild forcible disbandment function shown in FIG. 6 is realized by various hardware resources such as the operation processing unit 101 in the server device 100 operating with a game-related program and the like stored in a storage medium (storage unit) such as the ROM 102, the RAM 103, or the external memory 106.

A-5. Guild Forcible Disbandment Function

A status determination unit 1400 recognizes the activity status of each guild joining the battle league successively (or on a regular basis), using a timer 1300 and the like. Here, "recognize the activity status of a guild" means to recognize whether the guild is in an active state or an inactive state. In the case where the guild is found not participating in the guild battle, the guild is determined to be in the inactive state. Otherwise, the guild is determined to be in the active state, on the ground that the guild is found participating in the guild battle.

Examples of a criterion for determining whether the guild is in the active state or the inactive state (in other words, whether or not the guild is in the inactive state) are as follows.

(1) The guild does not participate in the guild battle at all for a predetermined period (e.g. one week).

(2) No login is performed by any player belonging to the guild for a predetermined period (e.g. one week).

(3) The number of players belonging to the guild is continuously below a minimum number (e.g. 2) of players necessary to establish the guild battle for a predetermined period (e.g. 5 days).

Such a criterion for determining whether or not the guild is in the inactive state is stored in a storage unit 1200 as criterion information. For instance, in the case where the above-mentioned criterion (2) "no login is performed by any player belonging to the guild for a predetermined period (which is assumed to be one week in the following example)" is stored in the storage unit 1200 as the criterion information, the status determination unit 1400 detects the login state of each player belonging to each guild, while referring to the timer 1300. The status determination unit 1400 then determines, for each guild, whether the guild is in the inactive state or the active state, based on the result of detecting the login state of each player.

Figure 7:
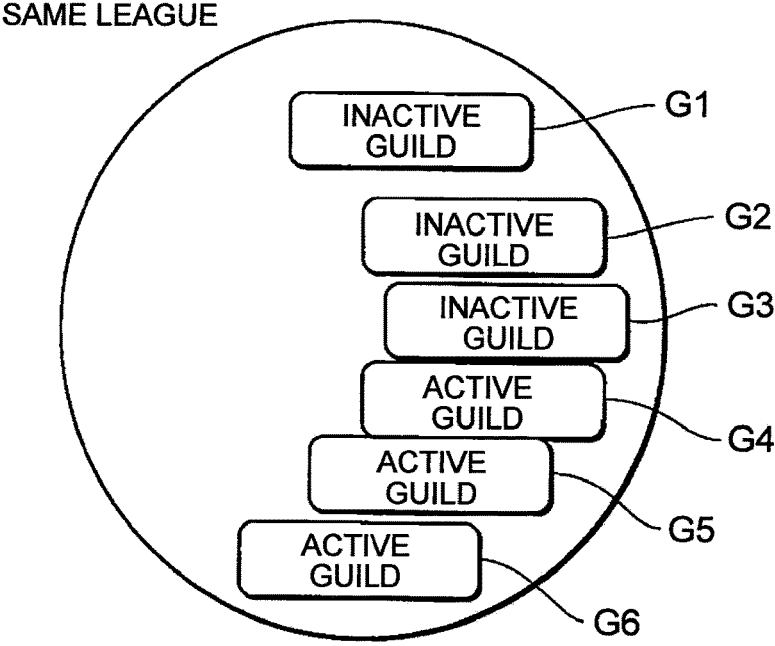
FIG. 7 is a schematic diagram showing a situation where inactive guilds and active guilds are included in the same league.

FIG. 7 is a schematic diagram showing a situation where guilds in the inactive state (hereafter referred to as "inactive guilds") and guilds in the active state (hereafter referred to as "active guilds") are included in the same league.

Upon determining that the state in which no login is performed by any player belonging to each of the guilds G1 to G3 continues for one week from among the guilds G1 to G6 in the league, the status determination unit 1400 determines the guilds G1 to G3 as inactive guilds. Meanwhile, upon detecting that login is performed by any player belonging to each of the guilds G4 to G6 at least once during one week, the status determination unit 1400 determines the guilds G4 to G6 as active guilds. The status determination unit 1400 notifies a guild integrated control unit 1100 of the activity status of each guild detected in this way, as guild activity information.

The above-mentioned criterion is merely an example, and the criterion for determining whether or not the guild is in the inactive state may be set or changed according to the game design and the like. For instance, in the case where the state in which the guild participates in the guild battle but the number of attacks made by the guild during the guild battle is extremely small (e.g. the number of actual attacks is 1 despite the number of possible attacks in the battle period being 10 or more) continuously occurs a plurality of times, the opponent guild might lose its motivation for the battle, as in the above-mentioned case. Such a situation may be used as the criterion for determining whether or not the guild is in the inactive state. Besides, the above-mentioned criteria (1) to (3) and other criteria may be combined according to need (e.g. the criteria (2) and (3) may be combined).

Referring back to FIG. 6, the guild integrated control unit 1100 has a role of forcibly disbanding any guild (i.e. inactive guild) determined to be in the inactive state, based on the guild activity information notified from the status determination unit 1400. The guild integrated control unit 1100 comprises a guild management unit 1110, a player specification unit 1120, and a disbandment notification unit 1130.

Figure 8:
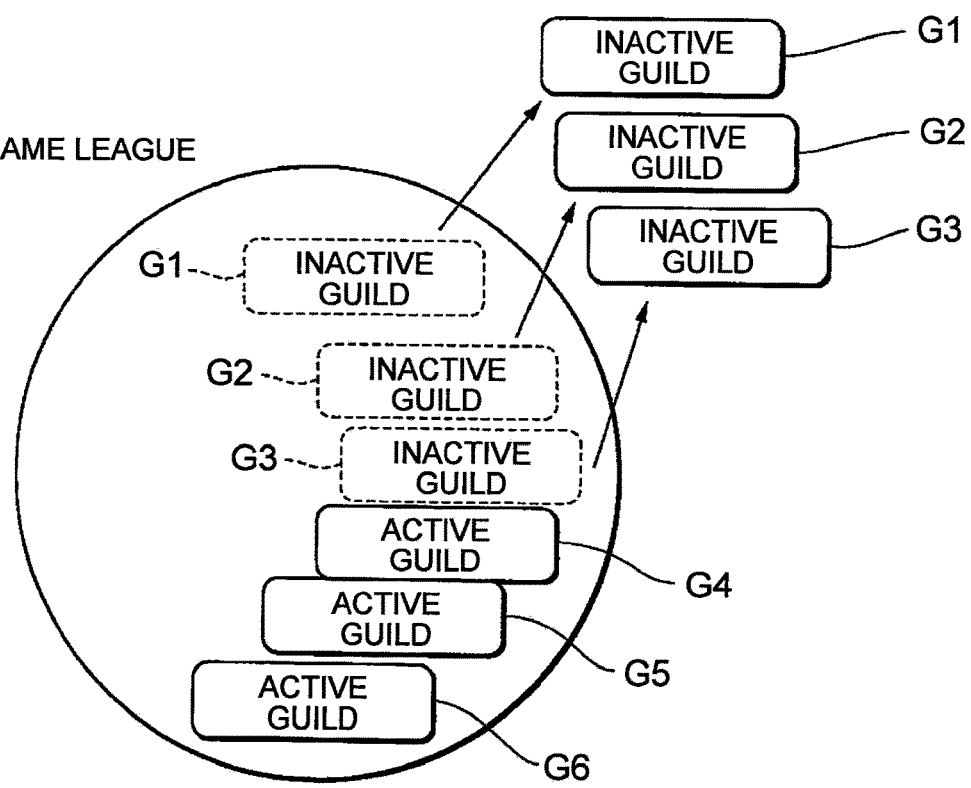
FIG. 8 is a schematic diagram showing a situation where inactive guilds are forcibly disbanded.

The guild management unit 1110 manages guild-player correspondence information indicating correspondence relations between guilds (e.g. guild identification IDs for identifying guilds) and players (e.g. ID numbers for specifying players), for all guilds joining the battle league. The guild management unit 1110 also specifies any inactive guild based on the guild activity information notified from the status determination unit 1400, and performs a procedure for forcibly disbanding the inactive guild. For example, the above-mentioned guild identification ID of the inactive guild is initialized to disable its function as a guild. As a result, the guilds G1 to G3 determined as inactive guilds are promptly deleted from the league and only the active guilds G4 to G6 remain in the league, as shown in FIG. 8 as an example. The timing of forcible disbandment is desirably when the battle in the league is not directly affected, i.e. when no guild battle is performed. Though the number of guilds in the league is reduced as a result of the forcible disbandment ("6"→"3" in the example shown in FIG. 8), the league competition continues without new guilds being added to the league. Note that whether or not to add new guilds and at which timing the inactive guilds are forcibly disbanded may be arbitrarily set or changed.

The player specification unit 1120 specifies the players belonging to the inactive guild forcibly disbanded by the guild management unit 1110 (i.e. the players belonging to the inactive guild until the disbandment), by referring to the guild-player correspondence information. How to specify the players belonging to the inactive guild may be arbitrarily set or changed according to the game design and the like. In the case where there are a plurality of inactive guilds as shown in FIG. 7, the player specification unit 1120 specifies the players for each inactive guild.

The disbandment notification unit 1130 notifies the players specified by the player specification unit 1120 as belonging to the inactive guild, of the disbandment of the guild to which the players belong. In detail, the disbandment notification unit 1130 acquires destination information (e.g. mail address) of the terminal device 2 of each player to be notified of the disbandment, from the guild management unit 1110. The disbandment notification unit 1130 transmits a disbandment message (for example, see FIG. 9) indicating the disbandment of the belonging guild to the terminal device 2 of each player, using the acquired destination information. As shown in FIG. 9, the disbandment message is a message that reflects the world of the game, and is displayed when each user performs login to access his or her My Home screen after the guild disbandment. At this timing, a menu related to the guild battle displayed on the display screen of each player is grayed out. By reading the disbandment message, each player recognizes that the guild to which he or she belongs has been forcibly disbanded and the player has become an independent player not belonging to any guild. Though this embodiment describes an example of notifying each player belonging to the guild after the guild is disbanded, the timing of notification is not limited to this. For instance, each player belonging to a guild that is likely to be disbanded may be notified by a warning message indicating that the guild is likely to be forcibly disbanded, before the guild is actually disbanded. In the case where the criterion is set to forcibly disband the guild when "no login is performed by any player belonging to the guild for one week", for example, each player belonging to the guild may be notified by the above-mentioned warning message when no login is detected from any player belonging to the guild for 5 days in a row. Each player belonging to the guild can thus learn that the guild is in danger of forcible disbandment. Here, the number of times the notification is made is not limited to one, and the warning message may be transmitted several times (e.g. after 3 days, after 5 days, and prior to the day of forcible disbandment) until the guild is actually forcibly disbanded.

By forcibly disbanding the guild whose activity is not detected for the predetermined period in this way, it is possible to prevent the present problem, i.e. the problem in that the players cannot feel the fun and thrill of the guild battle and lose their motivation to participate in or continue the game because, even after the start time of the guild battle is reached, there is no opponent guild or the opponent guild makes no attack.

Figure 10:
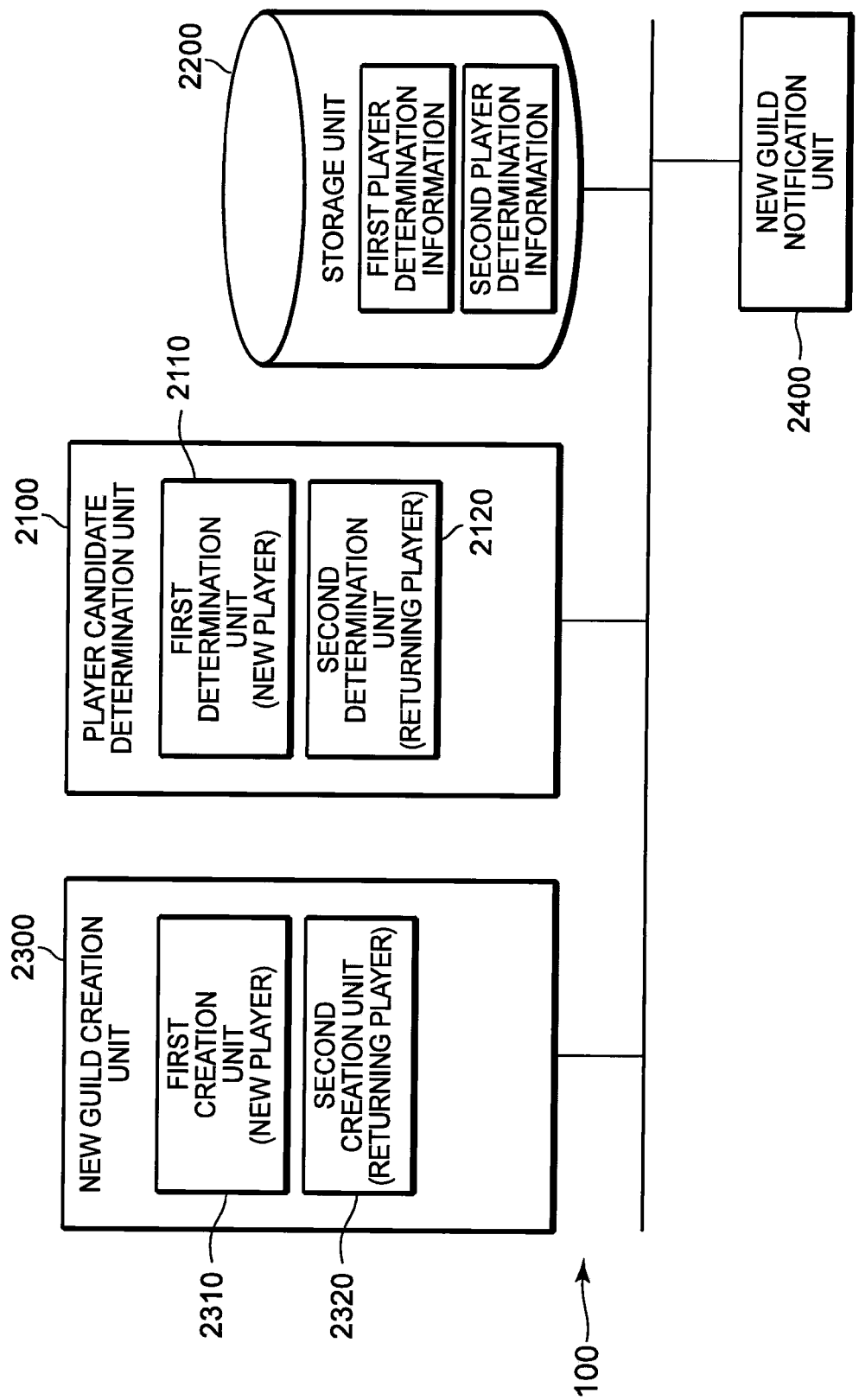
FIG. 10 is a functional block diagram showing a guild automatic formation function by the server device.

The reason why a guild needs to be forcibly disbanded lies in that the guild is made up of players whose motivation for the guild battle is low. To solve this fundamental problem, the inventors propose to automatically form a guild by players whose motivation for the guild battle is expected to be high (i.e. players who are expected to be active to a certain extent as a guild). The following describes a specific method of achieving such guild automatic formation, with reference to FIG. 10 and the like. A guild automatic formation function shown in FIG. 10 is realized by various hardware resources such as the operation processing unit 101 in the server device 100 operating with a game-related program and the like stored in a storage medium (storage unit) such as the ROM 102, the RAM 103, or the external memory 106.

A-6. Guild Automatic Formation Function

A player candidate determination unit 2100 has a role of detecting the activity status of an independent player not belonging to any group and determining whether or not to acknowledge the independent player as a candidate for a player belonging to a new guild.

There are two types of independent players: (1) a player who has just started the game and so does not belong to any guild yet; and (2) a player whose belonging guild has been lost by forcible disbandment and so does not belong to any guild. In the following description, an independent player of the type (1) is referred to as "new player", and an independent player of the type (2) is referred to as "returning player", for convenience's sake.

The player candidate determination unit 2100 comprises a first determination unit 2110 for determining whether or not to acknowledge the new player as a candidate for a player belonging to a new guild, and a second determination unit 2120 for determining whether or not to acknowledge the returning player as a candidate for a player belonging to a new guild.

A storage unit 2200 stores a criterion (hereafter referred to as "first player determination information") for acknowledging the new player as a candidate for a player belonging to a new guild and a criterion (hereafter referred to as "second player determination information") for acknowledging the returning player as a candidate for a player belonging to a new guild. The first player determination information is information defined by an absolute position (i.e. "progress" of the game) from the start of the game, such as "when area 3 in the game is passed". The second player determination information is information not defined by the "progress" of the game like the first player determination information but defined by "score" accumulated when playing the game, such as "when the score in the game exceeds 300 points".

The second player determination information is defined not by the "progress" of the game but by the "score" of the game, because the game progress varies among returning users unlike new users (e.g. one returning user has already advanced to area 10 while another returning user has only advanced to area 2) and so it is difficult to define the determination information by the absolute position from the start position. Though different parameters (the "progress" and "score" of the game) are used for the first player determination information and the second player determination information in this embodiment, the same parameter (e.g. only the "score" or only the "progress") may be used. Moreover, the determination information may be generated by using any other parameter (e.g. the number of items acquired) or combining a plurality of parameters (e.g. the "score" and the "progress").

Figure 11:
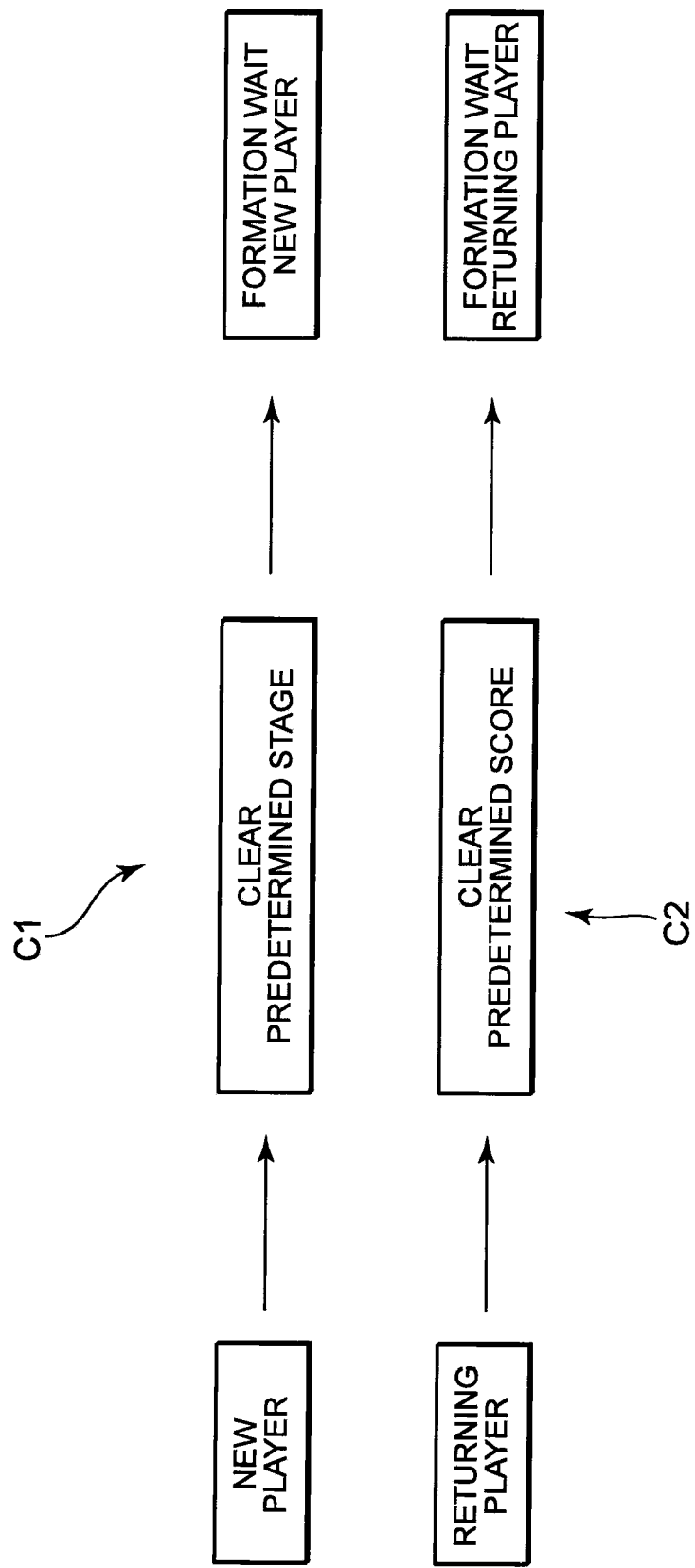
FIG. 11 is a schematic diagram for describing functions of a first determination unit and a second determination unit.

FIG. 11 is a schematic diagram for describing the functions of the first determination unit 2110 and the second determination unit 2120. The first determination unit 2110 successively monitors the game progress of the new player, and compares the game progress (activity status) of the new player with the first player determination information stored in the storage unit 2200. The first determination unit 2110 detects whether or not the game progress clears the criterion indicated by the first player determination information, in detail, whether or not the new player advances to a predetermined stage (e.g. whether or not area 3 in the game is passed). Upon detecting that the game progress clears the criterion indicated by the first player determination information (see C1 shown in FIG. 11), the first determination unit 2110 acknowledges the new player as a candidate ("formation wait new player" shown in FIG. 11) for a player belonging to a new guild, and notifies a new guild creation unit 2300 of the acknowledgement.

The second determination unit 2120 successively monitors the game score of the returning player, and compares the game score (activity status) of the returning player with the second player determination information stored in the storage unit 2200. The second determination unit 2120 detects whether or not the game score clears the criterion indicated by the second player determination information, in detail, whether or not the returning player exceeds a predetermined score (e.g. whether or not the score in the game exceeds 300 points). Upon detecting that the game score clears the criterion indicated by the second player determination information (see C2 shown in FIG. 11), the second determination unit 2120 acknowledges the returning player as a candidate ("formation wait returning player" shown in FIG. 11) for a player belonging to a new guild, and notifies the new guild creation unit 2300 of the acknowledgement.

The new guild creation unit 2300 comprises a first creation unit 2310 and a second creation unit 2320, and has a role of automatically forming a new guild in the case where formation wait new players or formation wait returning players satisfy a setting condition.

Figure 12:
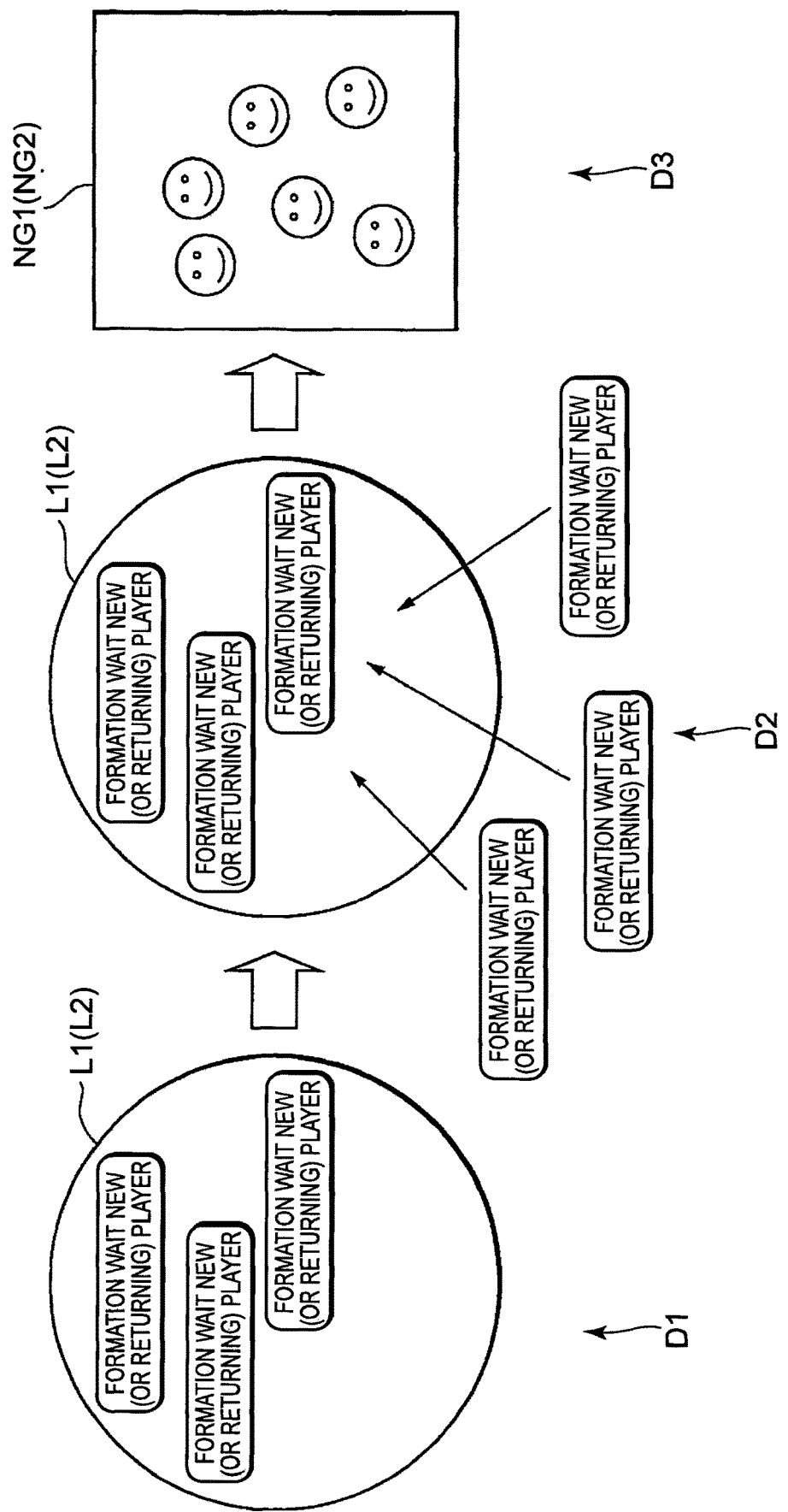
FIG. 12 is a schematic diagram for describing a new guild automatic formation function.

FIG. 12 is a schematic diagram for describing a new guild automatic formation function by the new guild creation unit 2300. The first creation unit 2310 comprises a formation wait new player list L1 for recognizing the status of formation wait new players (e.g. the number of players) (see D1 shown in FIG. 12). Upon being notified of a formation wait new player by the first determination unit 2110, the first creation unit 2310 adds the formation wait new player to the new player list L1 according to the notification. A condition (setting condition) for automatically forming a new guild, which is set by the game operator or the like, is registered in the first creation unit 2310. An example of the setting condition is to automatically form the new guild in the case where the number of formation wait new players reaches a specified number (e.g. 6). The first creation unit 2310 checks the number of formation wait new players registered in the new player list L1 at predetermined time intervals (or successively). Upon detecting that the number of formation wait new players registered in the new player list L1 is greater than or equal to the specified number (6) (see D2 shown in FIG. 12), the first creation unit 2310 forms a new guild NG1 (see D3 shown in FIG. 12). The first creation unit 2310 then notifies a new guild notification unit 2400 of the automatic formation of the new guild NG1 by the formation wait new players.

The second creation unit 2320 comprises a formation wait returning player list L2 for recognizing the status of formation wait returning players (e.g. the number of players). A condition (setting condition) for automatically forming a new guild, which is set by the game operator or the like, is registered in the second creation unit 2320. In the same manner as the first creation unit 2310, upon detecting that the number of formation wait returning players registered in the returning player list L2 is greater than or equal to the specified number (6) (see D2 shown in FIG. 12), the second creation unit 2320 forms a new guild NG2 (see D3 shown in FIG. 12). The second creation unit 2320 then notifies the new guild notification unit 2400 of the automatic formation of the new guild NG2 by the formation wait returning players.

Though this embodiment assumes the case where the setting condition ("in the case where the number of formation wait new players is greater than or equal to the specified number") in the first creation unit 2310 and the setting condition ("in the case where the number of formation wait returning players is greater than or equal to the specified number") in the second creation unit 2320 are common, how these conditions are set may be appropriately changed according to the game design and the like. For example, not only the number of players but also another condition (such as a condition relating to players' experience values or possessed items) may be set in one or both of the creation units. Though this embodiment separates formation wait new players and formation wait returning players, they need not necessarily be separated. For instance, in the case where a total number of formation wait new players and formation wait returning players is greater than or equal to the specified number (e.g. the number of formation wait new players is 4 and the number of formation wait returning players is 2), a new guild including these two types of formation wait players may be automatically formed. In the case where there are a large number of formation wait players, a new guild may be automatically formed by randomly extracting formation wait players. Alternatively, a new guild may be automatically formed by player voting after a predetermined grace period.

The new guild notification unit 2400, upon being notified of the automatic formation of the new guild by the new guild creation unit 2300, notifies each player belonging to the new guild.

In detail, the new guild notification unit 2400 acquires destination information (e.g. mail address) of the terminal device 2 of each player to be notified, from the storage unit 2200 or the like. The new guild notification unit 2400 transmits, to the terminal device 2 of each player, a formation message (for example, see FIG. 13) indicating that the new guild has been formed and the player belongs to the new guild, using the acquired destination information. As shown in FIG. 13, the formation message is a message that reflects the world of the game, and is displayed when each user performs login to access his or her My Home screen after the formation of the new guild. At this timing, a menu related to the guild battle displayed on the display screen of each player becomes active. By reading the formation message, each player recognizes that he or she has become a player belonging to the new guild, and can subsequently participate in the guild battle as a player belonging to the new guild.

Thus, in this embodiment, a guild is automatically formed only by players whose motivation for the guild battle is expected to be high (i.e. players who are expected to be active to a certain extent as a guild). This can prevent the problem in that, even though a new guild is formed, players belonging to the new guild do not participate in the guild battle and as a result each player belonging to its opponent guild loses his or her motivation to participate in or continue the game.

Moreover, even when a guild to which a player belongs is forcibly disbanded for some reason, by showing his or her motivation to participate in the game (e.g. the score exceeds a predetermined score), the player can participate in the guild battle again as a member of a newly formed guild. Hence, even a player whose guild is forcibly disbanded can feel the fun of the game without losing his or her motivation to participate in the game.

The invention is not limited to the foregoing embodiment and modifications, and various other modifications are possible without departing from the scope of the invention, as noted above. For example, the structure of the server device 100 shown in FIG. 1 is also applicable to each of the client computer 21 and the mobile terminal 22 as the terminal device 2, though they differ in throughput and the like. Conversely, the client computer 21 or the mobile terminal 22 may be used as the server device 100. That is, any computer device connected via the network 200 can function as the server device. Here, instead of realizing all functions of the server device 100 shown in FIG. 1 by the terminal device 2, such an application (hybrid application) that realizes part of the functions of the server device 100 by the terminal device 2 may be implemented as an example.

In the server device 100, a mass-storage device such as a hard disk or an SSD may be used to serve the same functions as a non-transitory recording medium such as the ROM 102, the RAM 103, the external memory 106, the memory device loaded in the slot drive 108, or the like. The storage device may or may not be subjected to redundancy by RAID or the like. Moreover, the storage device may not necessarily be connected to the operation processing unit 101 via the transmission path 120, and may be connected to, for example, another external device via the network 200 in cloud computing.

The network interface in each of the server device 100 and the terminal device 2 may be any of a wireless LAN device and a wired LAN device, which may be included inside or be an external device such as a LAN card. The terminal device 2 may be a game machine connectable to the network 200. Alternatively, the terminal device 2 may be an online karaoke machine.

The game settings in the guild battle are not limited to the specific example in the embodiment described above. For example, the guild battle is not limited to a battle between two guilds (e.g. the guilds G1 and G2), and may be a battle between three or more guilds.

As described above, a game control method, a server device, a game system, and a program according to the invention can significantly increase the fun, amusement, and thrill of a battle event to make the battle event and the whole game more active and enhance players' motivation to participate in or continue the game. Therefore, the invention can be widely and effectively used for all games (in particular, games having the element of social game) distributed, provided, and implemented especially in server-client network structures, all software- and hardware-related techniques for distribution, provision, and implementation of the games, and activities such as design, manufacture, and sales thereof.

DESCRIPTION OF REFERENCE NUMERALS

1: game system
2: terminal device
2a: screen
21: client computer (terminal device)
22: mobile terminal (terminal device)
100: server device
101: operation processing unit
102: ROM
103: RAM
104: external interface
105: input unit
106: external memory
107: image processing unit
108: slot drive
109: audio processing unit
110: network interface
111: display monitor
112: speaker device
120: transmission path
200: network (communication line)
1100: guild integrated control unit (group integrated control step, group integrated control unit)
1110: guild management unit
1120: player specification unit (specification step, specification unit)
1130: disbandment notification unit (notification step, notification unit)
1200: storage unit (storage unit)
1300: timer (determination step, determination unit)

1400: status determination unit (determination step, determination unit)
2100: player determination unit (determination step, determination unit)
2110: first determination unit
2120: second determination unit
2200: storage unit (storage unit)
2300: new guild creation unit (creation step, creation unit)
2310: first creation unit
2320: second creation unit
2400: new guild notification unit

What is claimed is:

1. A method of controlling a server for providing a battle game between groups, wherein each group comprises a plurality of players, the method comprising:
   detecting, by the server, an independent player, wherein the independent player does not belong to any of the plurality of groups;
   if the independent player has never belonged to any group and the independent player satisfies a first condition relating to an activity status of the independent player, acknowledging, by the server, the independent player as a first type of formation wait player who waits for forming of a new group;
   if the independent player has once belonged to a group and an activity status of the independent player satisfies a second condition relating to an activity status of the independent player, acknowledging, by the server, the independent player as a second type of formation wait player; and
   creating, by the server, a new group when the independent player satisfies a setting condition.

2. The method according to claim 1, wherein the activity status to which the first condition relates differs from the activity status to which the second condition relates.

3. The method according to claim 1, wherein acknowledging an independent player as a first type of formation wait player comprises:
   comparing, by the server, the activity status of the independent player with player determination information relating to the independent player; and
   determining, by the server, whether the independent player is acknowledged as a first type of formation wait player based on the comparison.

4. The method according to claim 3, wherein comparing, by the server, the activity status of the independent player with player determination information relating to the independent player comprises comparing at least one of:
   the player's game score with a predetermined score, and
   the player's progress with a predetermined progress criterion.

5. The method according to claim 1, wherein acknowledging an independent player as a second type of formation wait player comprises:
   comparing, by the server, the activity status of the independent player with player determination information relating to the independent player; and
   determining, by the server, whether the independent player is acknowledged as a second type of formation wait player based on the comparison.

6. The method according to claim 5, wherein comparing, by the server, the activity status of the independent player with player determination information relating to the independent player comprises comparing at least one of:
   the player's game score with a predetermined score, and
   the player's progress with a predetermined progress criterion.

7. The method according to claim 1, wherein the setting condition comprises at least one of:
   the experience value of the independent player is equal to or greater than a specified number; and
   the independent player possesses a specified item.

8. The method according to claim 1, further comprising:
   disbanding, by the server, a group of the plurality of groups determined to be in an inactive state.

9. The method according to claim 8, wherein
   determining, by the server, a group of the plurality of groups to be in the inactive state is carried out based on at least one of the following criteria:
   (1) the group has no battle against another group for a predetermined period or more;
   (2) no login to the battle game is performed by any player belonging to the group for a predetermined period or more; and
   (3) the number of players belonging to the group is below a predetermined number for a predetermined period or more.

10. A server for providing a battle game between groups, wherein each group comprises a plurality of players, the server comprising circuitry configured to:
    detect an independent player, wherein the independent player does not belong to any of the plurality of groups;
    if the independent player has never belonged to any group and the independent player satisfies a first condition relating to an activity status of the independent player, acknowledge the independent player as a first type of formation wait player who waits for forming of a new group;
    if the independent player has once belonged to a group and an activity status of the independent player satisfies a second condition relating to an activity status of the independent player, acknowledge the independent player as a second type of formation wait player; and
    create a new group when the independent player satisfies a setting condition.

11. A non-transitory computer-readable medium having stored thereon instructions, that, when executed by a server, cause circuitry of the server, to:
    detect an independent player, wherein the independent player does not belong to any of a plurality of groups, wherein each of the plurality of groups comprises a plurality of players;
    if the independent player has never belonged to any group and the independent player satisfies a first condition relating to an activity status of the independent player, acknowledge the independent player as a first type of formation wait player who waits for forming of a new group;
    if the independent player has once belonged to a group and an activity status of the independent player satisfies a second condition relating to an activity status of the independent player, acknowledge the independent player as a second type of formation wait player; and
    create a new group when the independent player satisfies a setting condition.

* * * * *